US010213946B2

(12) United States Patent
Schad et al.

(10) Patent No.: US 10,213,946 B2
(45) Date of Patent: Feb. 26, 2019

(54) POST-MOLD COOLING INJECTION MOLDED ARTICLES

(71) Applicant: NIIGON MACHINES LTD., Vaughan (CA)

(72) Inventors: Robert D. Schad, Toronto (CA); Daniel Jung, Woodbridge (CA); Michael Anthony Tedesco, Toronto (CA)

(73) Assignee: NIIGON MACHINES LTD., Vaughan (CA)

( * ) Notice: Subject to any disclaimer, the term of this patent is extended or adjusted under 35 U.S.C. 154(b) by 979 days.

(21) Appl. No.: 14/482,511

(22) Filed: Sep. 10, 2014

(65) Prior Publication Data

US 2014/0374956 A1 Dec. 25, 2014

Related U.S. Application Data

(63) Continuation of application No. PCT/CA2013/050185, filed on Mar. 12, 2013.
(Continued)

(51) Int. Cl.
*B29C 45/42* (2006.01)
*B29C 45/72* (2006.01)
*B29B 11/08* (2006.01)

(52) U.S. Cl.
CPC .......... *B29C 45/4225* (2013.01); *B29B 11/08* (2013.01); *B29C 45/7207* (2013.01); *B29C 2045/7214* (2013.01)

(58) Field of Classification Search
CPC .... B29C 2045/7214; B29C 2045/7221; B29C 2045/7228; B29C 2045/725; B29C 2045/7257; B29C 2045/7264
See application file for complete search history.

(56) References Cited

U.S. PATENT DOCUMENTS 4,836,767 A    6/1989 Schad
5,114,327 A *  5/1992 Williamson ............ B29C 35/16
                                                264/37.18
(Continued)

FOREIGN PATENT DOCUMENTS

JP    H09277322    10/1997
WO    2003035360   5/2003
(Continued)

*Primary Examiner* — Matthew J Daniels
*Assistant Examiner* — Mohammad M Ameen
(74) *Attorney, Agent, or Firm* — Bereskin & Parr LLP/S.E.N.C.R.L., S.R.L.

(57) ABSTRACT

An injection molding machine includes a base; a pair of platens supported by the base, the platens supporting respective mold halves to form a mold; and a part-handling apparatus for holding and treating articles from the mold, the part handling apparatus separate from the mold. The part handling apparatus includes a take-out plate including at least one set of first cooling receivers for receiving and retaining a first set of molded articles from the mold, the first cooling receivers conductively transferring a first amount of thermal energy away from the first molded articles; and a supplemental cooling plate comprising at least one set of second cooling receivers for receiving and retaining the first set of articles; and the second cooling receivers conductively transferring a second amount of thermal energy away from the first molded articles.

15 Claims, 19 Drawing Sheets

Related U.S. Application Data

(60) Provisional application No. 61/609,777, filed on Mar. 12, 2012.

(56) References Cited

U.S. PATENT DOCUMENTS

| | | |
|---|---|---|
| 6,299,431 B1 | 10/2001 | Neter |
| 6,391,244 B1 | 5/2002 | Chen |
| 2006/0138696 A1* | 6/2006 | Weinmann .......... B29C 45/7207 264/237 |

FOREIGN PATENT DOCUMENTS

| | | |
|---|---|---|
| WO | 2004041510 A1 | 5/2004 |
| WO | 2012037686 | 3/2012 |
| WO | 2013026145 | 2/2013 |

* cited by examiner

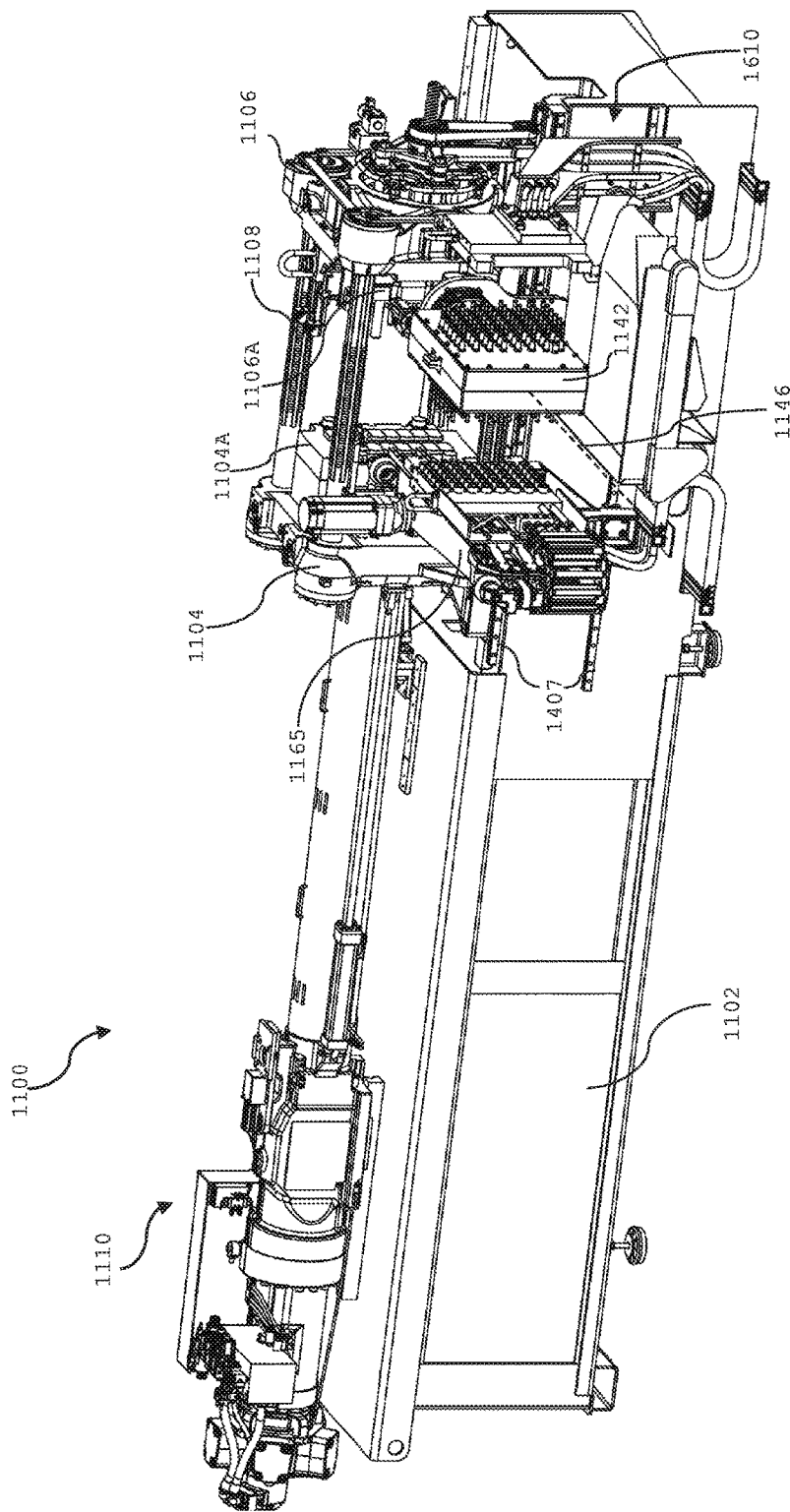

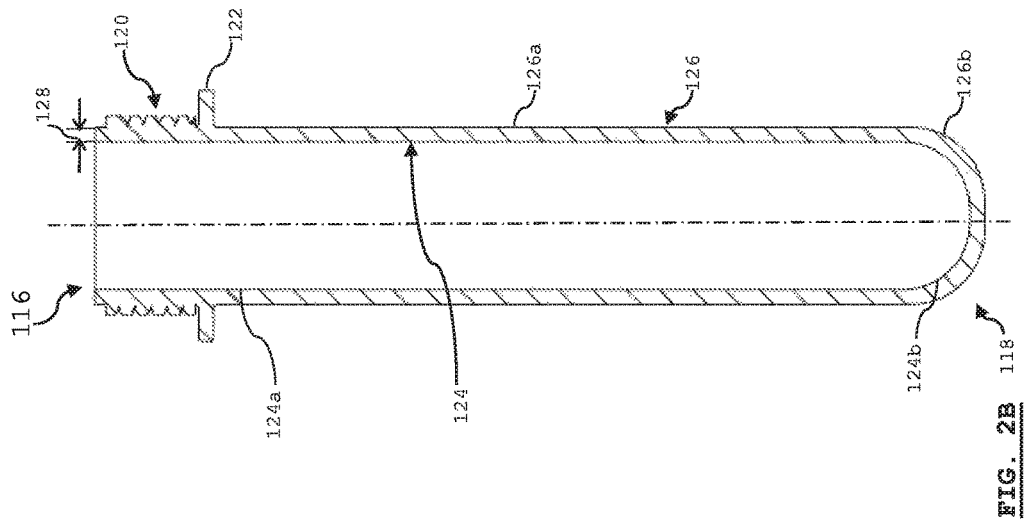
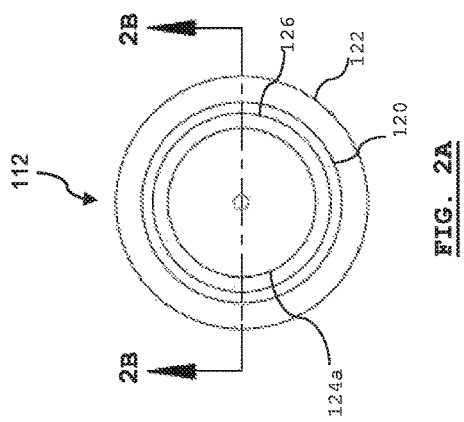
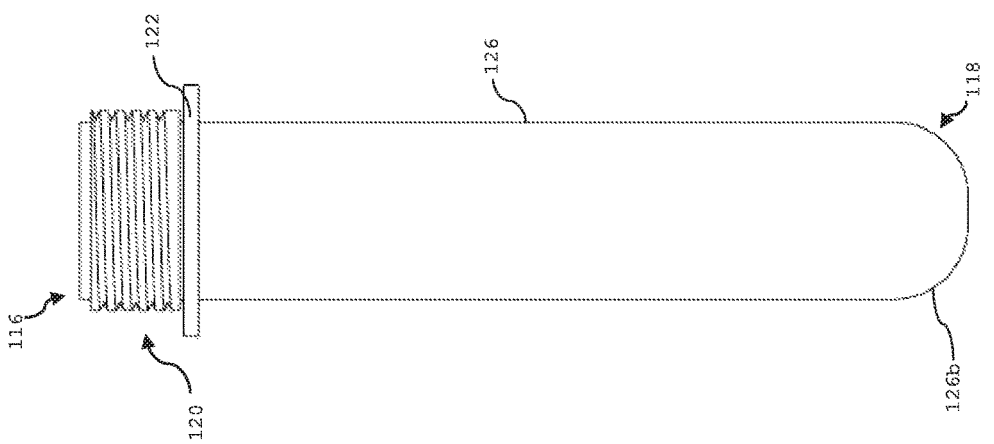

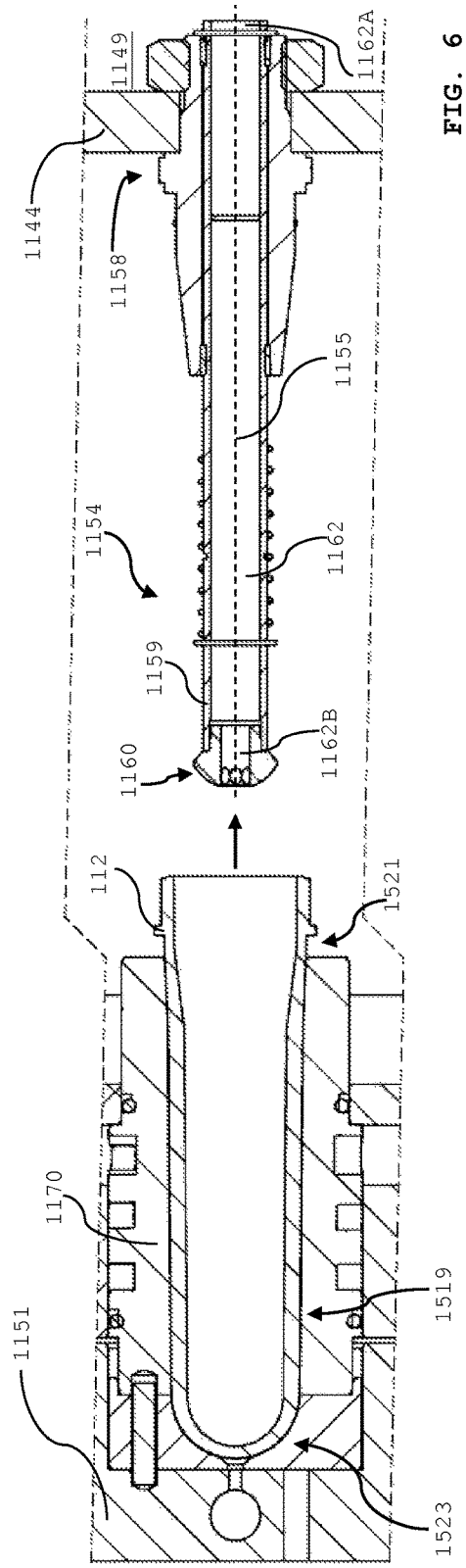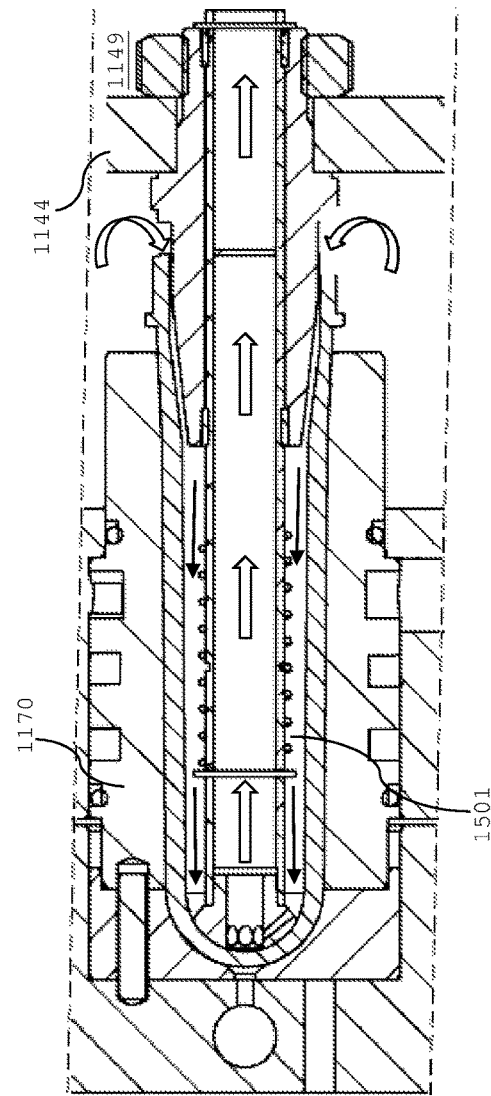

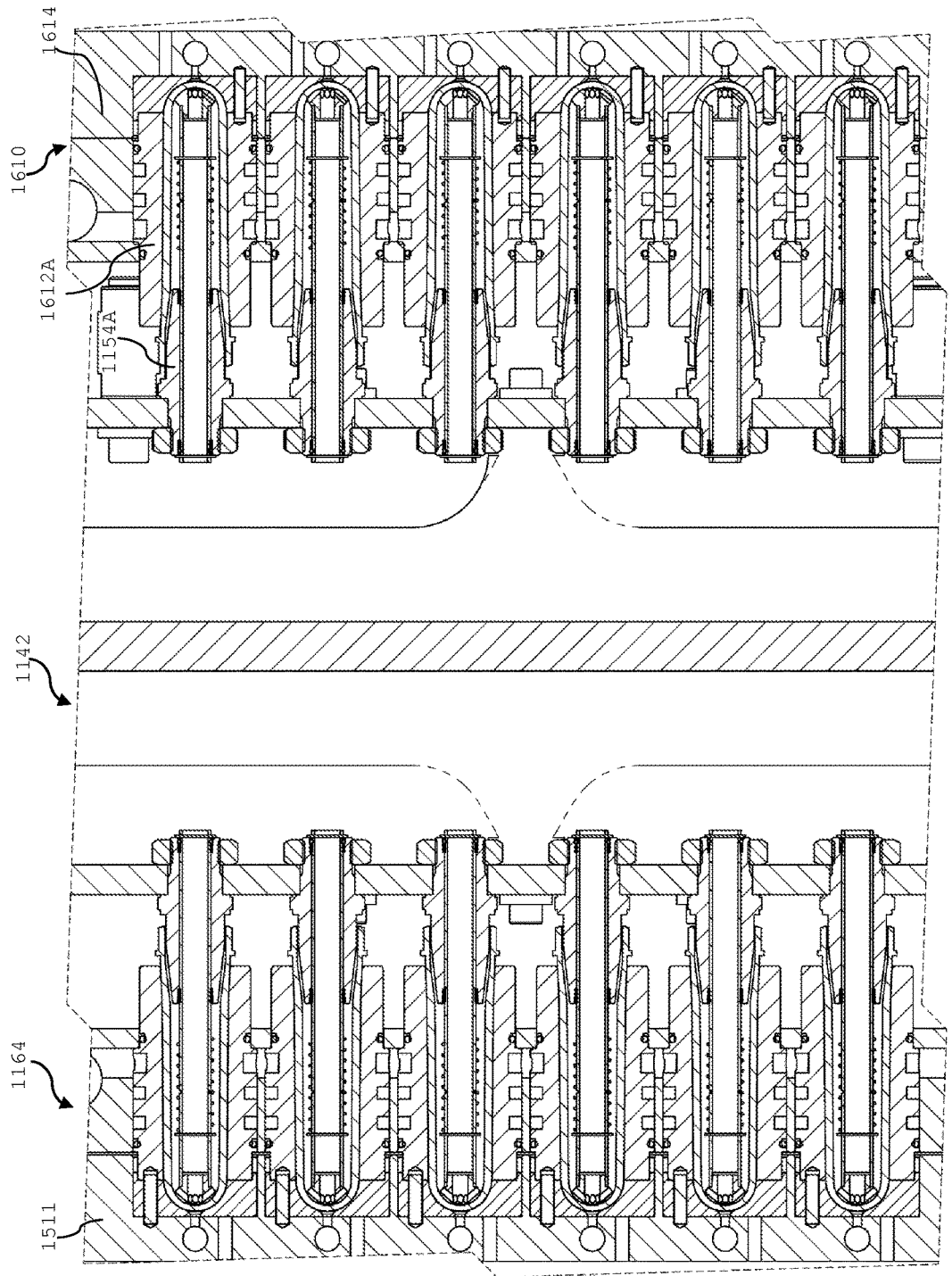

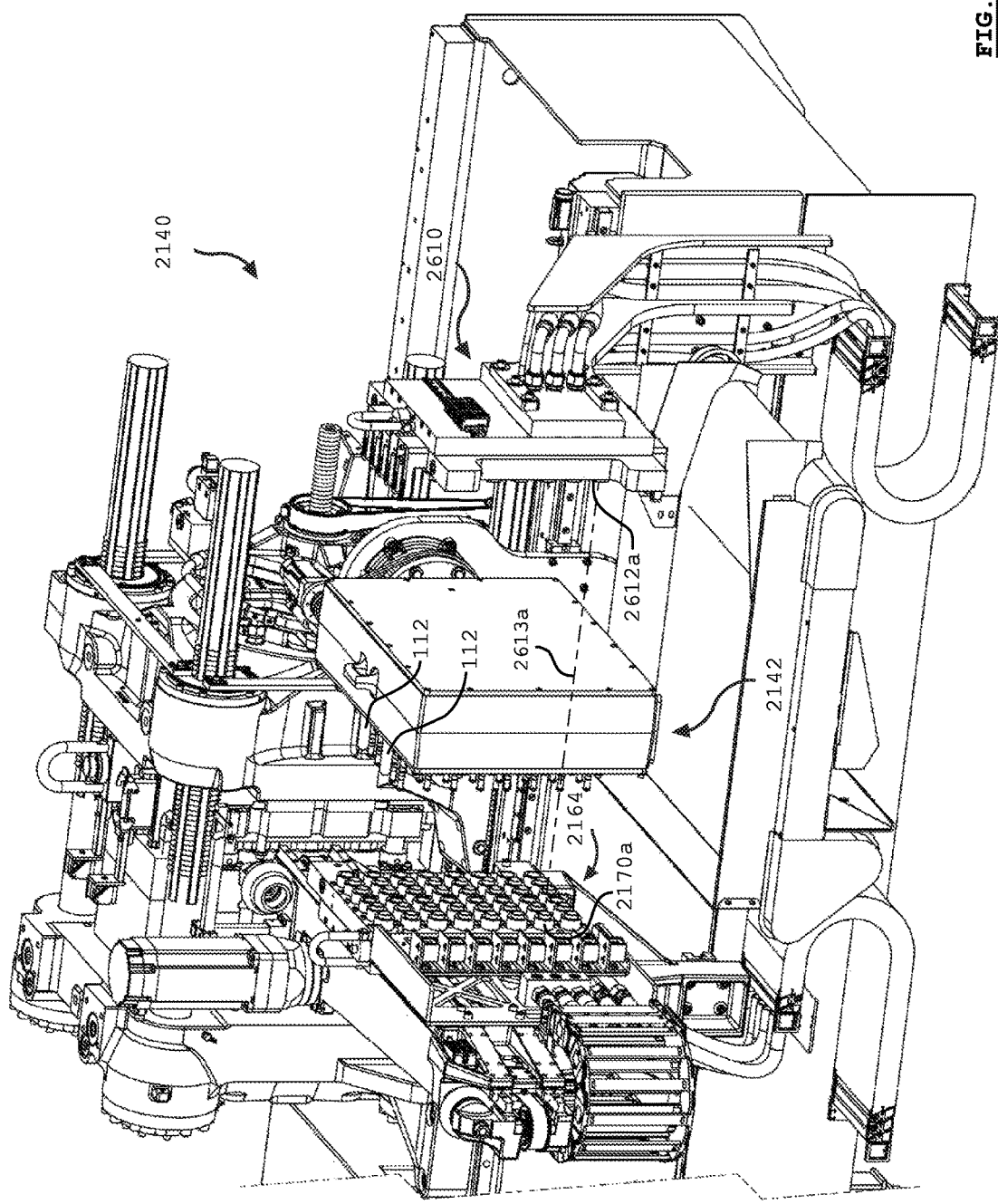

POST-MOLD COOLING INJECTION MOLDED ARTICLES

This application is a continuation of PCT Patent Application Ser. No. PCT/CA2013/050185, filed Mar. 12, 2013, which claims the benefit of Provisional Application Ser. No. 61/609,777, filed Mar. 12, 2012, which is hereby incorporated herein by reference.

FIELD

The disclosure relates to injection molding machines, and methods and apparatuses for post-mold cooling injection molded articles.

BACKGROUND

U.S. Pat. No. 4,836,767 (Schad) relates to an apparatus for producing molded plastic articles which is capable of simultaneously producing and cooling the plastic articles. The apparatus has a stationary mold half having at least one cavity, at least two mating mold portions, each having at least one core element, mounted to a movable carrier plate which aligns a first one of the mating mold portions with the stationary mold half and positions a second of the mating mold portions in a cooling position, a device for cooling the molded plastic article(s) when in the cooling position, and a device for moving the carrier plate along a first axis so that the aligned mold portion abuts the stationary mold half and the second mating mold portion simultaneously brings each plastic article(s) thereon into contact with the cooling device. The carrier plate is also rotatable about an axis parallel to the first axis to permit different ones of the mating mold portions to assume the aligned position during different molding cycles.

U.S. Pat. No. 6,299,431 (Neter) discloses a rotary cooling station to be used in conjunction with a high output injection molding machine and a robot having a take-out plate. A high speed robot transfers warm preforms onto a separate rotary cooling station where they are retained and internally cooled by specialized cores. The preforms may also be simultaneously cooled from the outside to speed up the cooling rate and thus avoid the formation of crystallinity zones. Solutions for the retention and ejection of the cooled preforms are described. The rotary cooling station of the present invention may be used to cool molded articles made of a single material or multiple materials.

U.S. Pat. No. 6,391,244 (Chen) discloses a take-out device for use with a machine for injection molding plastic articles such as PET preforms. The take-out device has a plurality of cooling tubes that receive hot preforms from the molding machine, carry them to a position remote from the molds of the machine for cooling, and then eject the cooled preforms onto a conveyor or other handling apparatus. The preforms are retained within the cooling tubes by vacuum pressure, but are then ejected by positive air pressure. A retaining plate spaced slightly outwardly beyond the outer ends of the cooling tubes is shiftable into a closed position in which it momentarily blocks ejection of the preforms during the application positive air pressure, yet allows them to be dislodged slightly axially outwardly from the tubes. Such slight dislodging movement is inadequate to vent the air system to atmosphere such that sufficient dislodging air pressure remains in tubes where the preforms might otherwise tend to stick and resist ejection. After the momentary delay, the plate is shifted to an open position in which all of the dislodged preforms are freed to be pushed out of the tubes by the air pressure. Preferably, the retaining plate is provided with specially shaped holes having pass-through portions that become aligned with the tubes when the plate is in its open position, and smaller diameter blocking portions that become aligned with the tubes when the plate is in its closed position. The smaller diameter blocking portions exceed the diameter of the neck of the preforms but are smaller in diameter than the flanges of the preforms such that surface areas around the blocking portions overlie the flanges to block ejection of the preforms as they undergo their dislodging movement.

U.S. Published Application No. 2006/0138696 purports to disclose a method and device for the secondary treatment and the cooling of preforms once they have been removed from the open mould halves of an injection moulding machine. The preforms are removed from the open moulds while still hot, by means of water-cooled cooling sleeves of a removal device, and are subjected to intensive cooling during the duration of an injection moulding cycle. Both the entire inner side and the entire outer side of the blow-moulded part are subjected to intensive cooling. Secondary cooling is then carried out, the duration thereof being equal to a multiple of the duration of an injection moulding cycle. After being removed from the casting moulds, the preforms are dynamically introduced into the cooling sleeves until they fully touch the walls thereof. The inner cooling is carried out in a time-delayed manner.

SUMMARY

The following summary is intended to introduce the reader to various aspects of the applicant's teaching, but not to define any invention. In general, disclosed herein are one or more methods or apparatuses related to injection molding, and to cooling injection molded articles outside the mold area of an injection molding machine.

According to some aspects of the teaching disclosed herein, an injection molding machine includes (a) a base; (b) a pair of platens supported by the base, the platens supporting respective mold halves to form a mold and the platens moveable relative to each other in a direction parallel to a machine axis between mold-open and mold-closed positions; and (c) a part-handling apparatus for holding and treating articles from the mold. The part handling apparatus is separate from the mold and includes (i) a take-out plate comprising at least one set of first cooling receivers for receiving and retaining a first set of molded articles from the mold, the first cooling receivers conductively transferring a first amount of thermal energy away from the first molded articles; (ii) a supplemental cooling plate comprising at least one set of second cooling receivers for receiving and retaining the first set of articles, the second cooling receivers conductively transferring a second amount of thermal energy away from the first molded articles; and (iii) a transfer shell having at least one shell side comprising at least one set of transfer pins for receiving and retaining the first set of articles, the transfer shell rotatable to move the at least one shell side among a load position for engagement with the take-out plate, a supplemental cooling position for engagement with the supplemental cooling plate, and an unload position for releasing molded articles from the part handling apparatus.

In some examples, the take-out plate may be movable along a first axis (e.g. a z-axis perpendicular to the machine axis) to a first axis advanced position between the mold halves and a first axis retracted position outside the mold halves, and when in the first axis retracted position, the first cooling receivers of the at least one set of first cooling receivers of the take-out plate may be opposed to and in vertical and horizontal alignment with the second cooling receivers of the at least one set of second cooling receivers of the supplemental cooling plate.

In some examples, the supplemental cooling plate is mounted to a supplemental slide fixed to the base, the supplemental slide generally parallel to the machine axis. In some examples, a supplemental actuator may be provided for advancing and retracting the supplemental cooling plate towards and away from the transfer shell.

In some examples, the transfer shell may be rotatable about a shell axis, the shell axis disposed in a fixed position relative to the base during operation of the machine. The transfer shell may be mounted to a shell slide fixed to the base, and the position of the shell axis relative to the base may be adjustable along the shell slide in response to a change in length of molded articles being produced.

In some examples, the at least one shell side, when in the supplemental cooling position, may be disposed between the supplemental cooling plate and the shell axis along a direction parallel to the machine axis. The at least one shell side of the transfer shell may include a first shell side and a second shell side, the second shell side generally parallel to and spaced apart from the first shell side. The second shell side may be engageable by the supplemental cooling plate when the first shell side is engaged by the take-out plate, providing, during at least a portion of the machine cycle, simultaneous conductive cooling of respective sets of molded articles in the respective sets of first and second cooling receivers.

In some examples, a part removal mechanism may be provided for collecting molded articles released from the shell side at the unload position and transporting the molded articles away from the machine. The part removal mechanism may include a conveyor disposed below the transfer shell and supported by the base of the machine.

According to some aspects, a part-handling apparatus for holding and treating articles from a mold of an injection molding machine in which the part handling apparatus is separate from the mold includes: (a) a take-out plate comprising at least one set of first cooling receivers for receiving and retaining a first set of molded articles from the mold, the first cooling receivers conductively transferring a first amount of thermal energy away from the first molded articles; (b) a supplemental cooling plate comprising at least one set of second cooling receivers for receiving and retaining the first set of articles, the second cooling receivers conductively transferring a second amount of thermal energy away from the first molded articles; and (c) a transfer shell having at least one shell side comprising at least one set of transfer pins for receiving and retaining the first set of articles, the transfer shell rotatable about an axis for moving the at least one shell side among a load position for engagement with the take out plate, a supplemental cooling position for engagement with the supplemental cooling plate, and an unload position for releasing the molded articles from the part handling apparatus.

In some examples, the load position and supplemental cooling position may be rotationally spaced apart about the shell axis by 180 degrees. The load position and supplemental cooling position may be spaced apart horizontally on opposite sides of the shell axis, and the unload position may be disposed vertically below the shell axis.

According to some aspects, an injection molding machine includes (a) a machine base; (b) opposed platens supported by the base and defining a mold area between the platens; (c) a transfer shell spaced away from the mold area and having at least one shell side, each shell side having a plurality of transfer pins, the transfer shell rotatable about a shell axis for moving the at least one shell side among a load position, a supplemental cooling position, and an unload position; (d) a take-out plate having a plurality of first cooling tubes for receiving molded articles from the mold and conductively cooling the molded articles retained therein, the take-out plate moveable relative to the base for presenting the molded articles in the cooling tubes to the transfer shell; (e) a supplemental cooling device having a plurality of second cooling tubes for receiving molded articles from the transfer shell and conductively cooling the molded articles retained therein, the supplemental cooling device moveable relative to the cooling shell for engaging the at least one shell side when in the supplemental cooling position; and (f) a part removal mechanism disposed at least partially below the shell axis for receiving molded articles released from the at least one shell side when in the unload position.

In some examples, the cooling shell may have two sides, one side engageable by the take-out plate and the other side simultaneously engageable by the supplemental cooling device. In some examples, the transfer pins may be provided with suction channels in communication with a vacuum source, the suction channels drawing an airflow through a space between an inner surface of the molded articles and an outer surface of the transfer pins, the airflow convectively cooling an inner surface of the molded articles simultaneously with the conductive cooling provided by the respective cooling tubes.

According to some aspects, a method for cooling molded preforms includes (a) transferring preforms of a first injection cycle from a mold to retained engagement on a take-out plate, the preforms having exterior surfaces and interior surfaces targeted for cooling; (b) drawing together the take-out plate and a transfer shell, the transfer shell spaced away from the mold; (c) releasing the preforms from the take-out plate and transferring the preforms to retained engagement on the transfer shell; (d) drawing together a supplemental cooling device and the cooling shell; (e) releasing the preforms from the transfer shell and transferring the preforms to retained engagement on the supplemental cooling device; and (f) releasing the preforms from the supplemental cooling device and transferring the preforms back to retained engagement on the transfer shell.

In some examples, after step f) the transfer shell may be oriented to an unload position; and the preforms may be ejected from the cooling shell. The method may include collecting the ejected preforms with a part removal mechanism disposed below the cooling shell In some examples, the step (a) of the method may include loading the preforms into cooling tubes affixed to the take-out plate, the exterior surfaces of the preforms bearing against inner surfaces of the cooling tubes when the preforms are in retained engagement on the take-out plate. The exterior surfaces of the preforms may be conductively cooled while the preforms are in retained engagement on the supplemental cooling device.

Step e) may include loading the preforms into supplemental tubes affixed to the supplemental cooling device, the exterior surfaces of the preforms bearing against inner surfaces of the supplemental tubes when the preforms are in retained engagement on the supplemental cooling device.

The method may include convectively cooling the interior surfaces of the preforms during a period of time extending at least between the completion of step b) and the initiation of step c). The method may include convectively cooling the interior surfaces of the preforms during a period of time extending at least between the completion of step d) and the initiation of step e). The convective cooling may include urging a convective airflow along the interior surfaces of the preforms. Steps c) and f) may include inserting transfer pins into the interiors of the preforms, the transfer pins affixed to the transfer shell and having internal fluid conduits in fluid communication with the convective airflow. The internal fluid conduits may have a proximate port adjacent the transfer shell for communication with a chamber in the transfer shell, and a distal port spaced apart from the proximate port for communication with an interior space of the preforms when the pins are inserted therein, and a suction force may be applied to the proximate ports to draw ambient air into the preforms.

According to some aspects, a method of cooling molded preforms includes (a) transferring a set of first preforms from mold core pins of a mold to retained engagement within a set of first cooling tubes of a take-out plate; (b) drawing together the take-out plate and a transfer shell, the transfer shell spaced away from the mold; (c) inserting a set of first transfer pins of the transfer shell into the first preforms and urging air flow through the first pins to cool interior surfaces of the preforms while the preforms are in retained engagement within the first cooling tubes; (d) releasing the first preforms from retained engagement within the first cooling tubes and transferring the first preforms to retained engagement on the transfer shell; (e) positioning the preforms into a first set of second cooling tubes of a supplemental cooling device while the preforms are in retained engagement on the transfer shell; (f) transferring the preforms from retained engagement on the transfer shell to retained engagement within the second cooling tubes; (g) urging airflow against inner surfaces of the preforms while the preforms are in retained engagement within the second cooling tubes; (h) releasing the preforms from retained engagement within the second cooling tubes and transferring the preforms back to retained engagement on the transfer shell; (i) separating the transfer shell from the supplemental cooling device; and (j) ejecting the preforms from the transfer shell.

According to some aspects, a method of producing cooled injection molded preforms includes conductively cooling exterior surfaces of the preforms during two machine cycles, and during the same two cycles simultaneously cooling interior surfaces of the preforms. In some examples, the exterior surface conductive cooling comprises holding the preforms in transfer tubes. The preforms can be continuously retained in the same transfer tubes during the two machine cycles. In some examples, the exterior surface conductive cooling can include cooling the transfer tubes with a flow of cooling fluid, and the cooling fluid can be chilled water flowing through internal ducts in one or both of the transfer tubes and take-out plate. The second stage cooling may include interior convective cooling way urging airflow inside the preforms and through pins inside the preforms.

In some examples, the interior surface cooling can comprise inserting a cooling pin in the preform while the preform is held in the transfer tube. The interior surface cooling can comprise urging cooling fluid to flow through an intermediate space between the pin and the preform. In some examples, the flow of cooling fluid can comprise blowing air through the pin from a pressure source, outward against the inner surface of the preform, and in some examples the air can thereafter vent to atmosphere. In some examples, the flow of cooling fluid can comprise drawing air (for example, from atmosphere external the pin) into the intermediate space and then into the pin, and the pin can be in fluid communication with a vacuum source.

In some examples, the cooling can comprise inserting a first pin into the preform holding for a cooling pause and then withdrawing the pin during a first machine cycle, and then inserting the same or another pin into the preform during a subsequent cycle and transferring the preform to that pin at the end of that cycle. The first pin can exit the preform with the preform remaining in the transfer tube when the first pin is moved away from the take-out plate. The second pin can remove the preform from the transfer tube and hold the preform on the second pin when the second pin is moved away from the take-out plate. In some examples, the rate of air flow into the intermediate space [e.g. from atmosphere] relative to the rate at which air is drawn out of the intermediate space [e.g. through the second pin] can be controlled to maintain vacuum in the intermediate space for holding the preform on the second pin. In some examples, the method includes transferring the preform from the second pin to a supplemental cooling tube.

According to some aspects of the present invention, a part handling apparatus for cooling injection molded articles comprises a first station of exterior conductive cooling via the take-out plate, and a second subsequent station of conductive cooling via a supplemental cooling device. Providing first and second stations with cooling tubes (e.g. 4 tube sets on a take-out plate, 4 tube sets on a cooling device), can double the amount of time during which conductive cooling can be applied to the exterior surfaces of the preforms, relative to a machine having the same number of tube sets just on its take-out plate (e.g. 4 sets). Alternatively, the present design can provide about the same time of exterior conductive cooling (4 cycles) but by placing half the cooling tubes on the take-out plate (e.g. 2 sets on the take-out plate) and the other half on the supplemental cooling device (e.g. the other 2 sets). This can reduce the tube 5 density on the take-out plate so that larger diameter and/or bell mouth preforms can be accommodated.

According to some aspects, a rotary mount for a transfer shell of an injection molding machine includes (a) a housing defining a housing interior with at least a first header chamber in the housing interior; (b) a rotary member supported by the housing, the rotary member rotatable about a shell axis, the rotary member including a face plate portion configured to have a transfer shell mounted thereto; (c) at least one mount aperture in the rotary member and having an outer end open to the face plate portion for fluid communication with the transfer shell, and an inner end disposed within the housing interior; and (d) a flow blocking member inside the housing, the flow blocking member moveable relative to the inner end of the mount passageway for alternately permitting and inhibiting fluid communication between the first header chamber and the outer end of the fluid passageway.

According to some aspects, a method of handling articles during processing by an injection molding machine includes (a) rotating a rotary transfer shell to move a first shell side of the transfer shell out of a stationary first position and into a stationary second position, at least a first set of molded articles retained on a first set of transfer pins on the first shell side when in the first position; and (b) while the first shell side is moving according to the rotation of step (a), releasing the first set of molded articles from the first shell side.

In some examples, the first shell side may move continuously when rotating between the first and second positions. The first shell side may accelerate from a rotational speed of zero when in the first position to a maximum rotational speed when oriented about midway between the first and second positions.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the teaching of the present specification and are not intended to limit the scope of what is taught in any way. In the drawings:

FIG. 1 is a back perspective view of an injection molding machine in accordance with or more aspects of the teaching disclosed herein;

FIG. 2 is a front view of an exemplary article formed by the machine of FIG. 1;

FIG. 2A is a top view of the article of FIG. 2;

FIG. 2B is a cross-sectional view of the article of FIG. 2A, taken along the lines 2B-2B;

FIG. 6 is an enlarged view showing a portion of the take-out plate and shell in spaced apart relation;

FIG. 7 shows the structure of FIG. 6 in an engaged position;

FIG. 14 is an enlarged cross-sectional view of a portion of the structure of FIG. 13;

FIGS. 15a-15f show another example of a part-handling apparatus.

DETAILED DESCRIPTION

Figure 3:
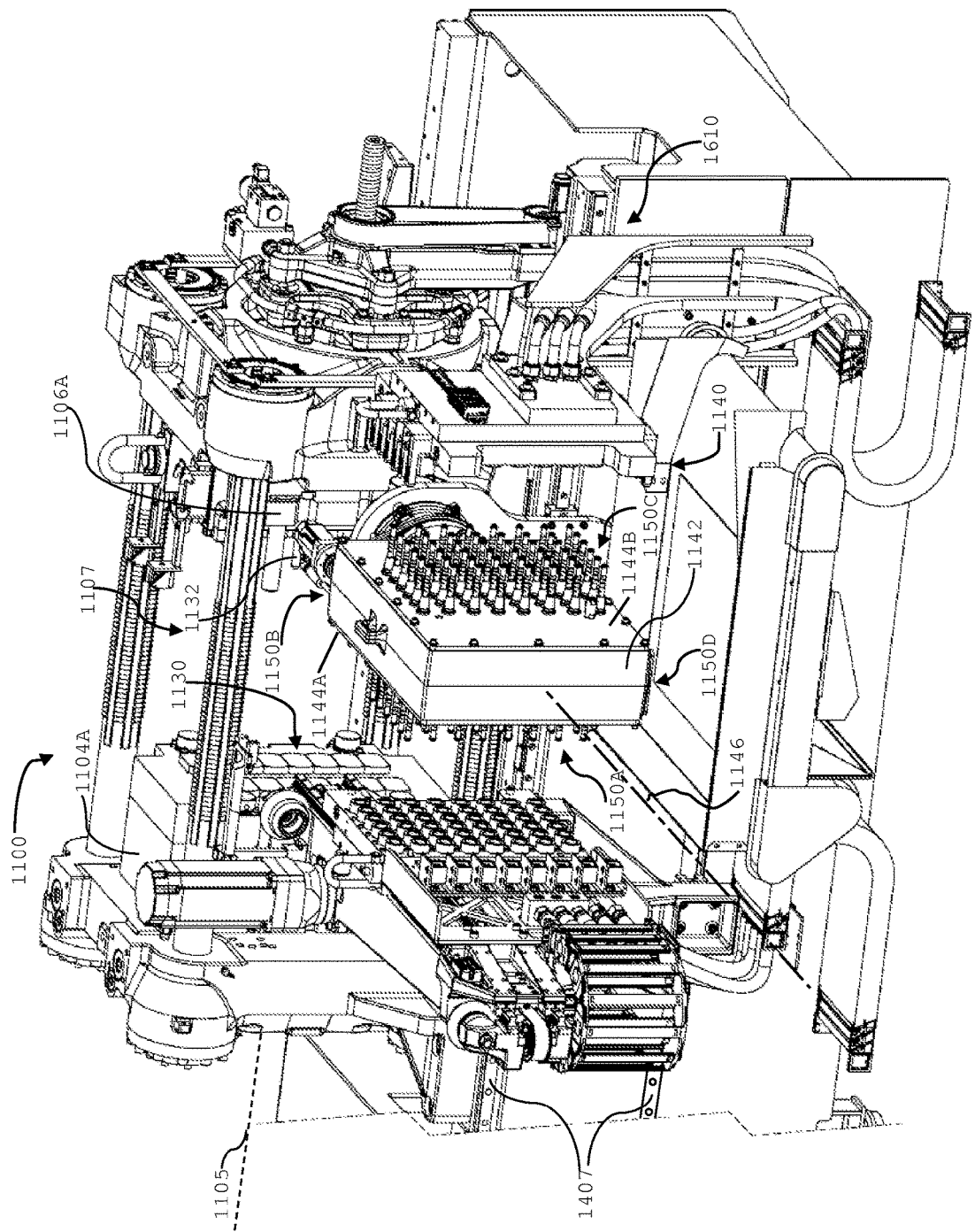
FIG. 3 is a perspective view of a portion of the machine of FIG. 1, showing part handling features in greater detail.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Referring to FIG. 1, an example of an injection molding machine 1100 includes a base 1102, with a stationary platen 1104 and a moving platen 1106 mounted to the base 1102 and coupled together via tie bars 1108. The moving platen 1106 can translate towards and away from the stationary platen 1104 along a machine axis 1105. A mold 1107 is formed between the platens 1104, 1106, the mold 1107 defined at least in part by a first mold half 1104a mounted to the stationary platen 1104, and a second mold half 1106a mounted to the moving platen 1106. An injection unit 1110 is mounted to the base 1102 for injecting resin or other mold material into the mold 1107 to form a molded article.

In the example illustrated, the injection molding machine 1100 is shown set up for molding preforms that can be used as input material for subsequent processing, for example, a blow molding operation to produce beverage containers. With reference to FIG. 2, an exemplary preform 112 comprises a generally elongate tubular article extending along a preform axis 114, and having opposing open and closed ends 116, 118. A threaded portion 120 for receiving a closure may be provided adjacent the open end 116. A radially outwardly extending annular flange 122 may be disposed adjacent the threaded portion 120, with the threaded portion 120 disposed axially between the open end 116 and the flange 122. The preforms have an inner surface 124 that can include a generally cylindrical inner wall portion 124a along the axial extent of the preform (between the open and closed ends), and a generally concave inner end portion 124b at the closed end. The preforms 112 have an outer surface 126 spaced apart from the inner surface 124 that can include a generally cylindrical outer wall portion 126a along the axial extent of the preform and a convex outer end portion 126b at the closed end. The spacing between the inner and outer surfaces 124, 126 generally defines a preform wall thickness 128.

With reference again to FIG. 1, in the example illustrated for producing the preforms, the first mold half 1104a (attached to the stationary platen 1104) can comprise a cavity side of the mold 1107 having recesses (or mold cavities) 1130 for forming the outer surface 1126 of the preforms 112. The second mold half 1106a can comprise a core side of the mold 1107 having mold core pins 1132 for insertion into the mold cavities 1130 and forming the inner surface 124 of the preforms 112. In the example illustrated, the machine 1100 has an equal quantity of mold cavities 130 and mold pins 132, this quantity defining the cavitation number of the mold 1107. Typical mold cavitation numbers include 16, 32, 48, 96 or more. In the example illustrated, the mold cavitation number is 16, and the mold has 16 mold cavities 1130 and 16 mold pins 1132.

Referring also to FIG. 3, the injection molding machine 1100 is, in the example illustrated, provided with a part-handling apparatus 1140 for moving and/or treating articles formed in the mold 1107 of the machine. The part-handling apparatus 1140 comprises a rotary transfer shell 1142 having at least one shell side 1144, each one of the at least one sides 1144 rotatable together with the transfer shell 1142 about a shell axis 1146. In the example illustrated, the shell axis 1146 is generally horizontal and perpendicular to the machine axis 1105. The transfer shell 1142 has (in the example illustrated) two generally planar sides including a first side 1144a and a second side 1144b (FIG. 4), the two sides generally parallel and on opposed sides of the axis 1146. The transfer shell 1142 can hold molded articles to facilitate moving the articles from one part of the machine to another, and can optionally or alternatively facilitate cooling of molded articles (in some cases the transfer shell 1142 is referred to as a "cooling shell").

Figure 4:
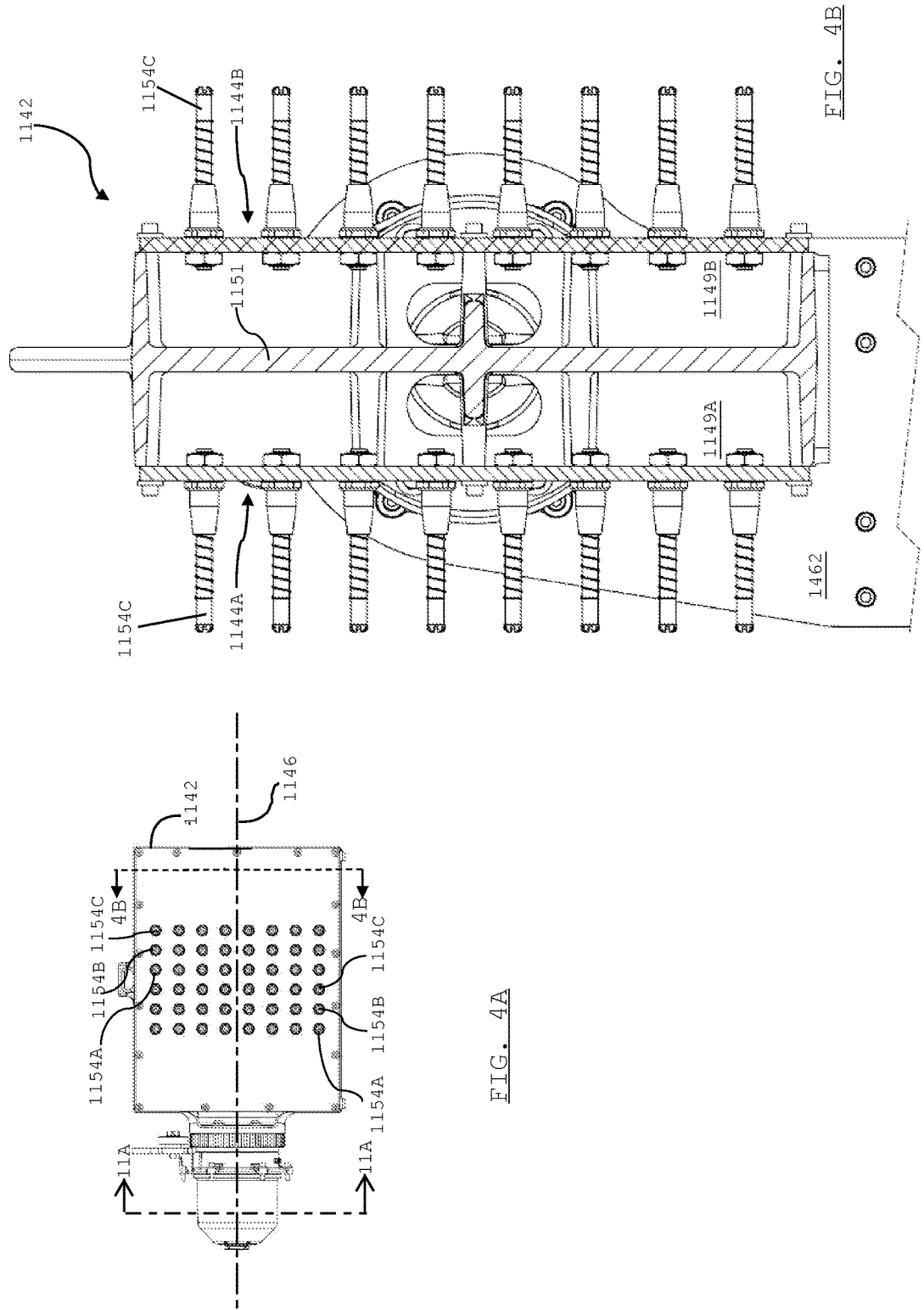
FIG. 4A is an elevation view of a portion of the transfer shell of FIG. 3, as seen from the position of the take-out plate.
FIG. 4B is a cross-sectional view of the structure of FIG. 4A, taken along the lines 4B-4B.

With reference to FIG. 4, the shell 1142 has a plurality of interior shell side chambers 1149 associated with respective ones of the sides 1144 of the shell 1142. In the example illustrated, the shell side chambers 1149 include a first shell side chamber 1149a adjacent (and/or bounded at least in part by) an inner surface of the first side 1144a. The shell 1142 further includes a second shell side chamber 1149b adjacent (and/or bounded at least partially by) an inner surface of the second side 1144b. The shell includes an interior wall 1151 generally separating the interior of the shell into the two shell side chambers 1149a and 1149b.

Rotation of the transfer shell 1142 about the shell axis 1146 can move the sides 1144 between various stations 1150. The stations 1150 can comprise four stations, namely, 1150a-1150d (FIG. 3) spaced apart by 90 degree increments about the shell axis 1146. One of the stations (e.g. first station 1150a) can comprise a load station for loading articles onto the shell 1142, and another station (e.g. fourth station 1150d) can comprise an unload station 1150d for unloading articles from the shell 1142. At least one optional supplemental treatment station can be provided between the load and unload stations 1150a, 1150d.

Figure 5:
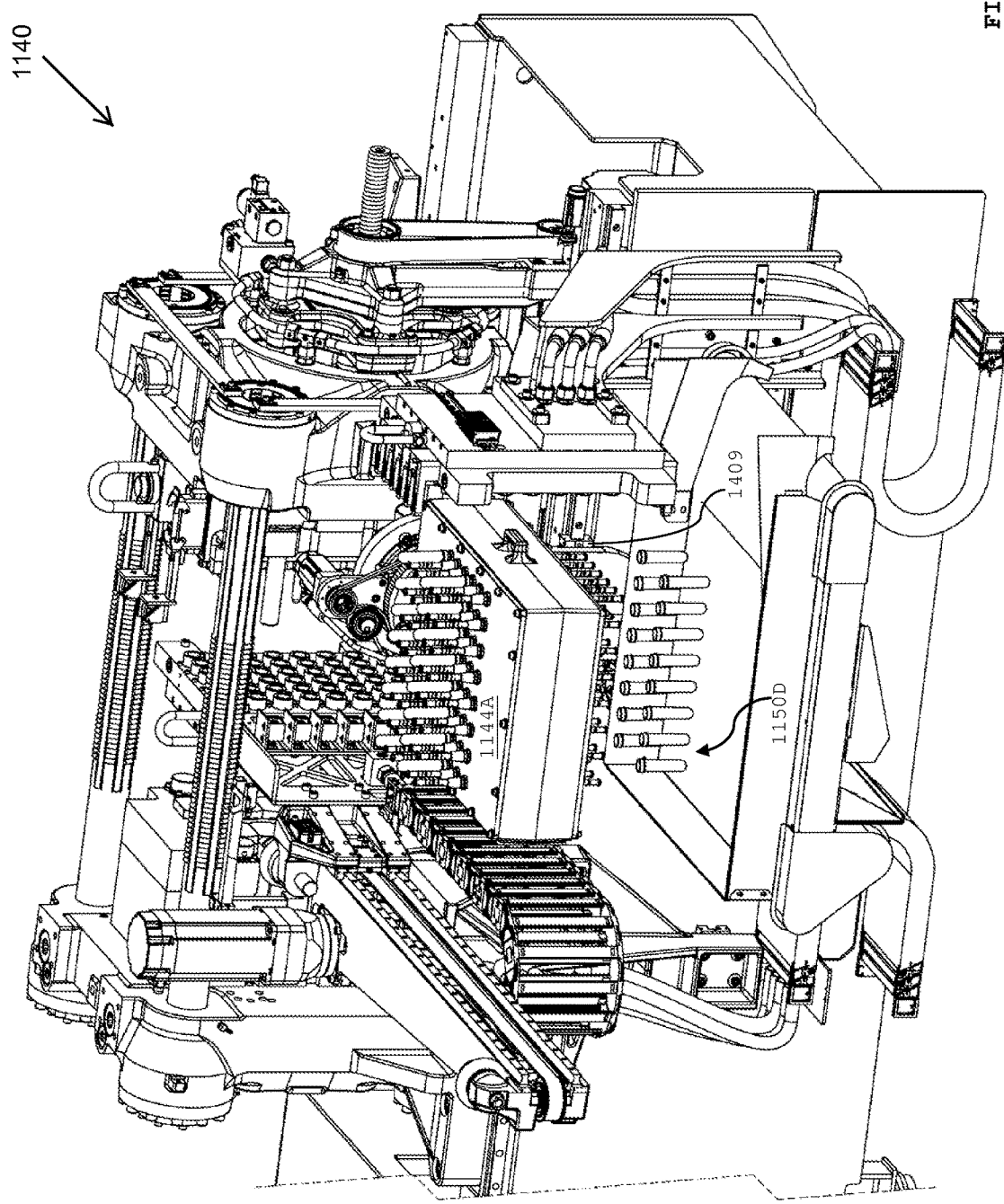
FIG. 5 shows a similar view as FIG. 3, with the shell moved to another position.

In the example illustrated, a side of the shell 1142 is in the load station 1150a when it is in a vertical orientation and nearest (along the machine axis) to the mold 1107. In FIG. 3, the first side 1144a of the shell is in the load station 1150a. A side of the shell 1142 is, in the example illustrated, in the unload station 1150d when it is oriented in a generally horizontal plane beneath the shell axis 1146. In FIG. 5, the second side 1144b of the shell is in the unload station 1150d.

At least one of the second and third stations 1150b, 1150c can comprise an optional supplemental treatment station. In the example illustrated, the third station 1150c comprises a supplemental treatment station, opposite the load station 1150a. The second station 1150b can comprises an optional second supplemental treatment station provided opposite the unload station 1150d. The supplemental treatment stations may repeat a portion or all of the same cooling treatment as provided at the load and/or unload station. Optionally, the supplemental treatment stations may provide additional cooling treatment, such as, for example, cooling fluid along exterior surfaces of the preforms.

In the example illustrated, the shell rotates in a clock-wise direction about the shell axis when viewed from the front of the shell (i.e. when facing the non-operator side of the machine 1100) as shown in FIG. 3. Indexing the shell (i.e. rotating the shell 90 degrees) moves the first side 1144a from the load position 1150a to the position at 1150b, and simultaneously moves the second side 1144b from the supplemental treatment position 1150c to the unload position 1150d (see FIG. 5). Indexing the cooling shell another 90 degrees moves the first side 1144a (in the example illustrated) to the supplemental treatment station 1150c, positioned opposite the load station 1150a. A further 90 degree index (i.e. a total of 270 degrees from the load position 1150a) moves the first side 1144a to the unload position 1150d. In alternate examples, the shell can rotate clockwise, or can alternate between clockwise and counter clockwise rotation during various parts of the machine cycle.

With reference to FIGS. 4 and 7, in the example illustrated, the part-handling apparatus 1140 further comprises a plurality of shell receivers in the form of transfer pins 1154 (also called retaining cooling pins). The transfer pins 1154 (including a first set of first transfer pins 1154a and at least a second transfer set of second transfer pins 1154b) disposed on each side 1144 of the shell 1142. The transfer pins 1154 are, in the example illustrated, configured to provide cooling to interior surfaces of the preforms, and to have preforms retained on the pins as the cooling shell indexes the sides 1144 among at least some of the various stations 1150.

Each one of the transfer sets (also called receiver sets) may have an equal quantity of individual receivers (e.g. individual retaining cooling pins 1154), and the quantity of retaining cooling pins 1154 in each set may be equal to the cavitation number of the mold 1107. In the example illustrated, there are three receiver sets on each of the at least one sides 1144 of the shell 1142. Each receiver set has 16 receivers (first receiver set has 16 first retaining cooling pins 1154a, second receiver set has 16 second retaining cooling pins 1154b, and a third receiver set has 16 third retaining cooling pins 1154c—see FIGS. 4 and 9). There are three receiver sets per side 1144 providing a total of 48 receivers (i.e. 48 retaining cooling pins 1154) per side of the cooling shell 1142 and a total of six receiver sets on the shell 1142 (a total of 96 retaining cooling pins 1154 on the shell).

The pins 1154a of the first pin set are spaced apart from each other in a pin pattern. In the example illustrated, the pin pattern is defined by two columns spaced apart from each other horizontally by a column spacing. The pin pattern further includes eight rows spaced apart from each other in a vertical direction that, in the example illustrated, is not equal between each pair of adjacent rows. The second set pins 1154b and third set pins 1154c are arranged relative to each other in the same pin pattern as the first set pins 1154a.

With reference to FIG. 6, in the example illustrated, each one of the retaining cooling pins 1154 extends lengthwise along a first pin axis 1155 and comprises a first pin base 1158 fixed to the respective side of the shell, and a first pin tip 1160 spaced away from the base 1158 (along the receiver axis 1155), with a first pin sidewall 1159 extending between the base 1158 and the tip 1160. A first pin fluid channel 1162 can be provided through each cooling pin 1154, each fluid channel 1162 having one or more proximal openings 1162a adjacent the base 1158 for fluid communication between the channel 1162 and a respective one of the side shell chambers 1149 to which the retaining cooling pin 1154 is attached, and one or more distal openings 1162b for fluid communication between the fluid channel 1162 and an intermediary space 1501, between the external surface of the retaining cooling pin 1154 and the internal surface of a preform 112 in which the pin has been inserted.

Figure 8:
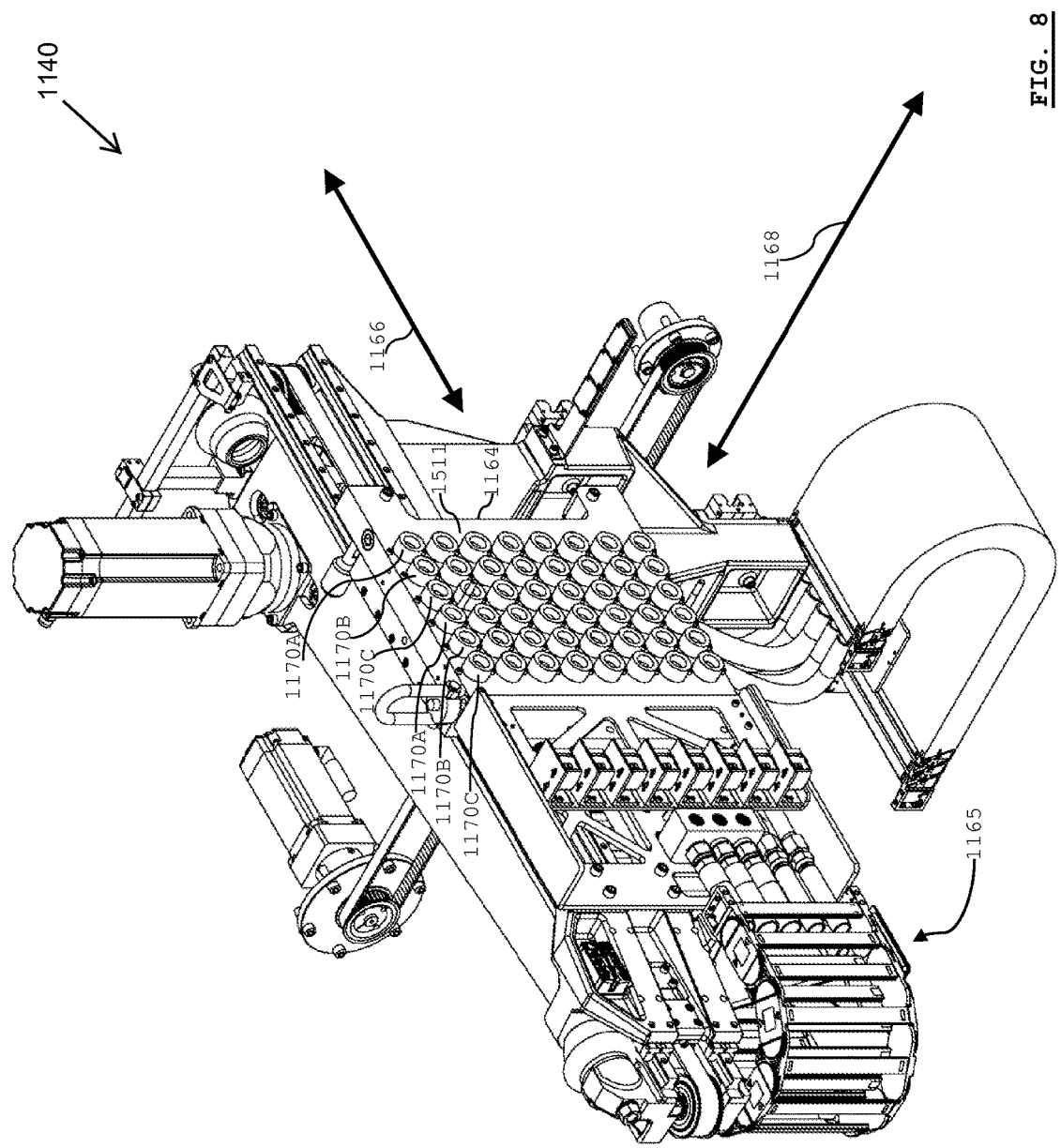
FIG. 8 is a perspective view of another portion of the part handling apparatus of FIG. 1.

Referring to FIGS. 1 and 8, a take-out plate 1164 is movable between the mold 1107 and the cooling shell 1142 for transferring articles therebetween. The take-out plate generally transfers articles from the mold to a position outside the mold for engagement by the pins 1154 of a side 1144 of the cooling shell positioned in the load station. When the first side 1144a is in the load position 1150a, articles are transferred to one of the first, second, or third set retaining cooling pins 1154a, 1154b, 1154c of the first side 1144a of the cooling shell 1142 during one (a first) injection cycle, and articles may be transferred from the mold to another, different one of the first, second, and third set retaining cooling pins 1154a, 1154b, 1154c of the first side 144a during another (a second) injection cycle. In this specification, numbering of injection cycles is used to identify distinct injection cycles, and incremental numbering does not necessarily define a particular order or succession of cycles (incremental numbering may define a particular order in some parts of the discussion where such ordering is expressly specified).

In the example illustrated, the take-out plate 1164 is joined to a linear robot 165 that can translate the take-out plate 1164 along a first robot axis 1166 between at least one advanced position in which the take-out plate is disposed between the mold halves 1104a, 1106a, and at least one retracted position in which the take-out plate 1164 is clear of the mold 1107 (FIG. 3). In the example illustrated, the first robot axis (z-axis) 1166 is parallel to the shell axis 1146. Furthermore, the take-out plate 1164 is, in the example illustrated, optionally translatable along a second robot axis (x-axis) 1168 that is parallel to the machine axis 1105.

The take-out plate 1164 has a quantity of first cooling receivers for receiving molded articles from the mold core pins 1132. In the example illustrated, the cooling receivers are in the form of first cooling tubes 1170. The quantity of first cooling tubes 1170 can be equal to or greater than the cavitation number of the mold 1107 and can be equal to or greater than the quantity of individual retaining cooling pins 1154 in each receiver set. In the example illustrated, the quantity of first cooling tubes 1170 provided on the take-out plate 1164 comprises three sets of 16 tubes each—first set tubes 1170a, second set tubes 1170b, and third set tubes 1170c, for a total of 48 transfer tubes. The first set of first cooling tubes 1170a of the take-out plate 1164 are, in the example illustrated, spaced apart from each other in a tube pattern of eight rows and two columns that matches the pin pattern. The tubes of the second and third transfer tube sets are similarly spaced apart from each other in the same tube pattern of eight rows and tubes columns, and in the example illustrated, are interlaced with first set tubes 1170a.

In the example illustrated, the take-out plate 1164 can be moved to a first x-axis advanced position (along the first robot axis 166) in which the first set tubes 1170a are aligned with the mold core pins 1132 to receive preforms 112 therefrom. The take-out plate 1164 can also be moved to a second z-axis advanced position (along the first robot axis 1166) in which the second set tubes 170b are aligned with the mold core pins 1132, and to a third z-axis advanced position in which the third set tubes 1170c are aligned with the mold core pins 1132.

The take-out plate 1164 can also be moved to at least one z-axis retracted position (along the first robot axis 1166) for selectively aligning the first cooling tubes 1170 with pins 1154 on the side 1144 of side of the shell in the load station 1150a. In the example illustrated, the take-out plate 1164 is movable relative to the cooling shell to one z-axis retracted position in which the 48 transfer tubes 1170 are each simultaneously aligned with respective ones of the 48 transfer pins 1154 of the shell side in the load position. The first set tubes 1170a are aligned with the first set cooling pins 1154a, the second set tubes are aligned with the second set cooling pins 1154b, and the third set tubes 1170c are aligned with the third set cooling pins 1154c.

Figure 9:
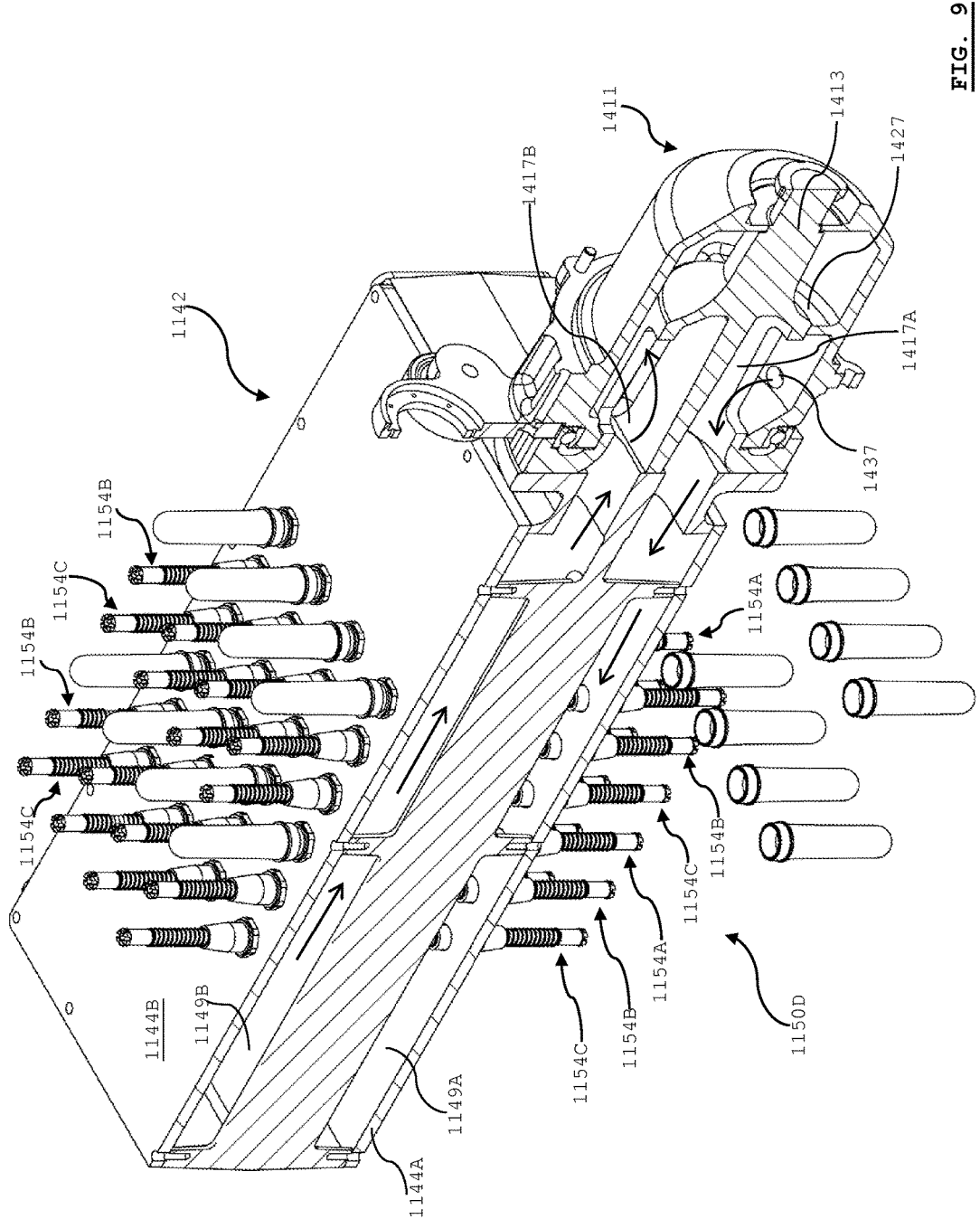
FIG. 9 is an enlarged cross-sectional view of the shell portion of FIG. 5, taken vertically through the axis of rotation of the shell.

Referring to FIG. 9, the shell 1142 can be rotatably mounted to a support column 1462. The support column 1462 is, in the example illustrated, adjustably supported by a rail 1407 fixed to the machine base 1102 and oriented parallel to the machine axis 105. The rail 1407 can be engaged by bearing shoes 1409 fixed to the support column 1462. This can facilitate adjusting the axial position of the cooling shell in response to the axial length of a particular pre-form being produced. For example, when producing shorter preforms, the cooling shell can be moved along the rail towards the stationary platen 04 (and then locked in place), which can reduce the length of x-axis travel that the take-out plate must traverse when moving parts from the mold to the shell. Furthermore, in the example illustrated, the rail 1407 used to support the support column 1462 is the same rail used to support the robot to which the take-out plate is attached. This can facilitate providing correct and accurate relative alignment between the take-out plate and the cooling shell.

Figure 10:
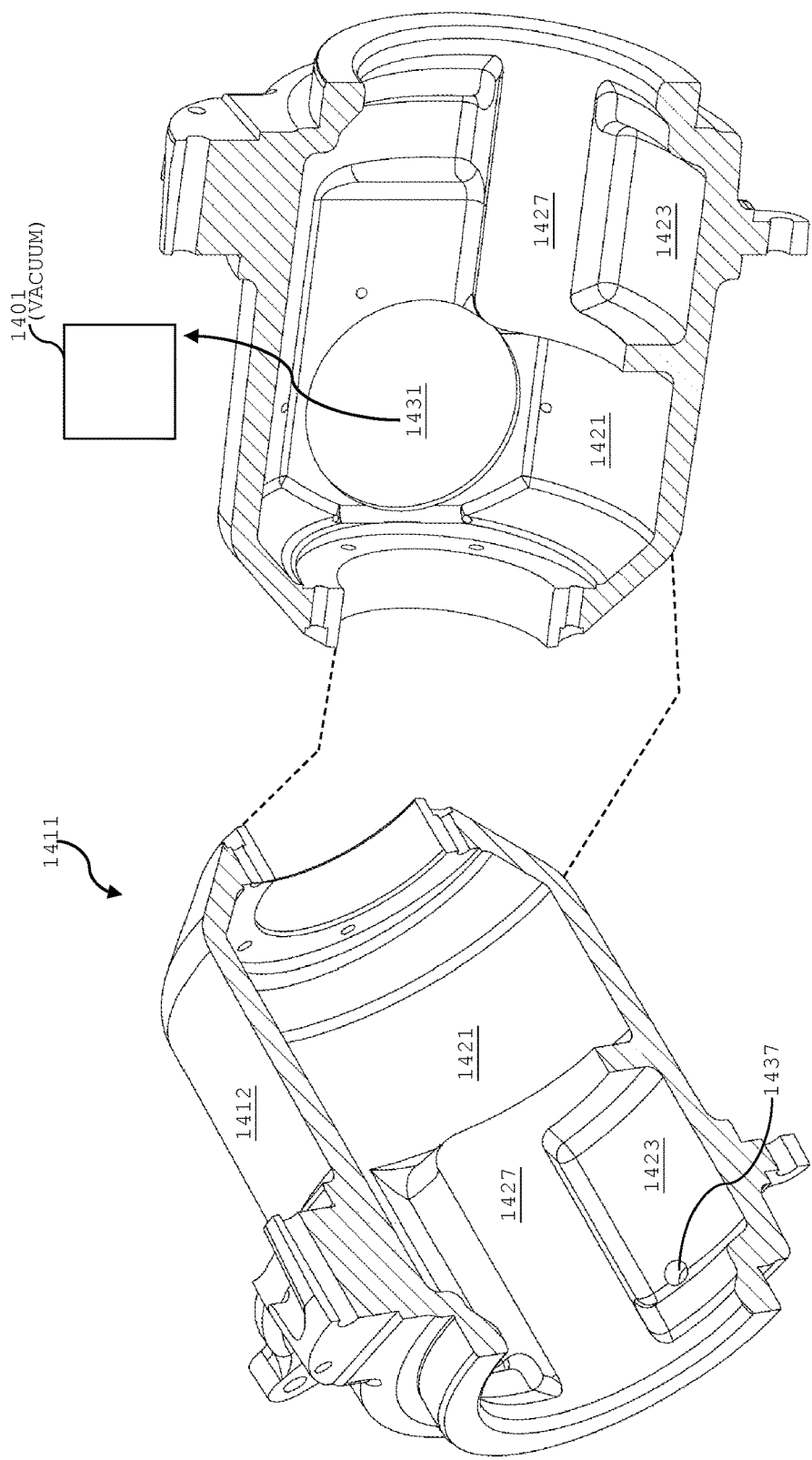
FIG. 10 is an exploded perspective view of a portion of the structure of FIG. 9.

Referring also to FIG. 10, the support column 1462 includes a header 1411 having a header housing 1412 and a header interior for fluid communication with the fluid pressurization device 1401. In the example illustrated, the cooling shell 1142 is joined to the support column 1462 by a rotary mount 1413 that is rotatably supported within the header housing 1412, permitting rotation of the cooling shell 1142 relative to the support column 1462. The rotary mount 413 comprises at least one mount aperture 417 that provides fluid communication between the header of the support column 1462 and the cooling shell 1142 when mounted to the support column 1462. In the example illustrated, the rotary mount 1413 has two apertures 1417a, and 1417b which provide fluid communication between the header and the respective shell side chambers 1149a, 1149b.

Figure 11C:
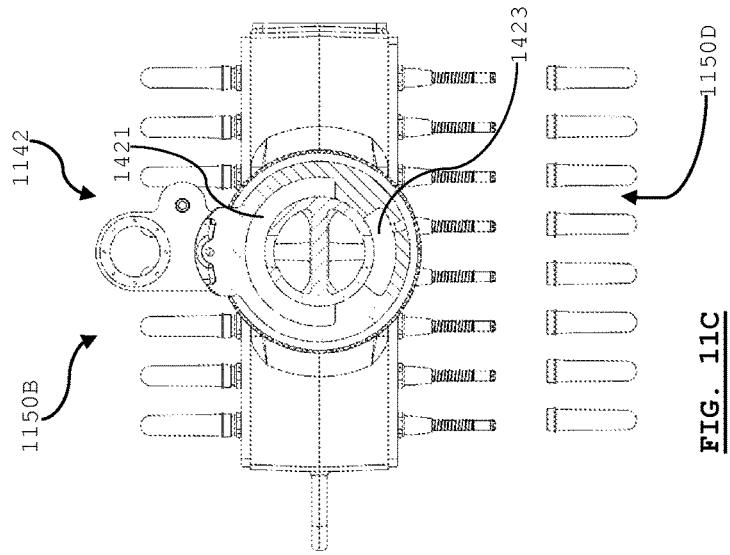
FIGS. 11B and 11C show the structure of FIG. 11A, but with the shell moving through an intermediate position to the unload position.
Figure 11B:
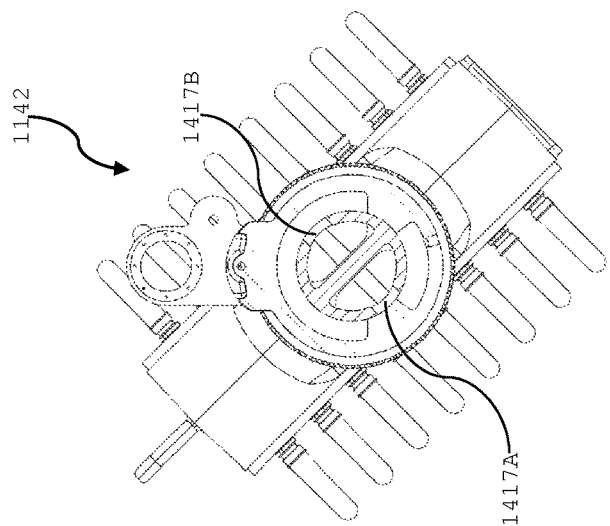
Figure 11A:
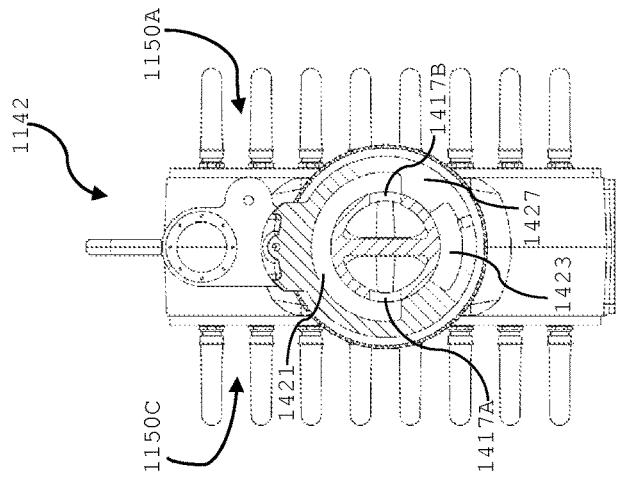
FIG. 11A is a cross-sectional view of the structure of FIG. 4, taken along the lines 11A-11A.

In the example illustrated, the header 1411 has a first header chamber 1421 in the housing 1412, in fluid communication with the shell side chamber 1149 of the respective side when in and moving between the load position 1150a and the supplemental station 1150c (see FIG. 11A) The header 1411 also has a second chamber 1423 separate from the first chamber 1421 and in fluid communication with the shell side chamber 1149 of the side 1144 in the unload station 1150d (see FIG. 11C).

In the example illustrated, the rotary mount 1413 has a generally cylindrical outer surface and one interior mount chamber in fluid communication with, and forming axial extensions of, each shell side chamber. The apertures 1417, 1417b are provided in the outer sidewall of the rotary mount, on opposite sides thereof (180 degrees apart) and opening to respective ones of the interior mount chambers. As the rotary mount rotates, the apertures move between communication with the first chamber 1421 and the second chamber 1423 A dividing wall 1427 having opposed first and second side surfaces (1427a, 1427b) extends across a portion of the header interior.

The first header chamber 1421 has a first header port 1431 in fluid communication with the fluid pressurization device 1401. The fluid communication can be provided via a first conduit having one connected to first header port 1431, and another end connected to the fluid pressurization device 1401. The first conduit can be free of valves or other flow blocking elements, to provide continuous fluid communication between the fluid pressurization device 1401 and the first header chamber 1421. In the example illustrated, the first conduit is connected to the inlet of a fluid pressurization device 1401, generating a vacuum in the first header chamber 1421.

The second header chamber 1423 has a second header port 1437 in fluid communication with a fluid pressurization device. In the example illustrated, the port 1437 is connected to a positive pressure source, such as a source of compressed air or the outlet of a blower, and provides continuous positive pressure to the second chamber 1423.

Referring to FIG. 14, a retaining force may be exerted on the preforms after (and optionally before and/or during) transfer of the preforms from the respective set of tubes 1170*a* or 1170*b* of the take-out plate to the respective set of retaining cooling pins 1154 of the cooling shell. The retaining force can help hold the preforms 1112 on the retaining cooling pins 1154. In the example illustrated, the retaining force is at least partially generated by a negative pressure (vacuum) provided in an intermediate space 1501 between an outer surface of the cooling pins 1154 and an inner surface of the preforms. The negative pressure can generate a suction force to facilitate holding the preform on the pin, when desired.

Each transfer pin 1154 can be provided with slots 1503 or similar flow gates at its base, providing a total cross-sectional inlet area (for admitting ambient air into the intermediate space) that is less than the cross-sectional outlet area (for withdrawing air from the intermediate space to the shell side chamber 1149 via channel 1162). A flow of cooling fluid (identified at arrows 1505) can be maintained while simultaneously providing negative pressure in the intermediate space 1501 for holding the preform 1112 on the pin 1154. A similar second intermediate space 1502 is provided between the inner surface of the preforms 112 and the exterior of the load station cooling pins 1354, but in the example illustrated, no flow gates are provided to balance the rate of air flow with the pressure differential between the intermediate space 1502 and ambient. This can facilitate providing a more vigorous flow of cooling fluid in the second intermediate space 1502.

In the example illustrated, continuous vacuum/cooling fluid flow 1505 is provided from at least the time the respective shell side chamber is in the load station to at least the time the respective shell side chamber arrives at the unload station. In example illustrated, the fluid flow 1505 is also provided at least until the preforms at the unload station are ejected. The duration of the fluid flow 1505 while at the unload station prior to ejection can be at least 50 percent, and in some examples more than 75 percent of the total time that the respective side of the shell is at the unload station. In the example illustrated, the fluid flow 1505 is provided for more than about 90 percent of the total time that the respective side is at the unload station.

Referring to FIG. 8, the take-out plate 1164 generally includes a carrier body to which a plurality of take-out receivers can be secured, the take-out receivers shaped and arranged to interact with molded articles in one half of the mold (i.e. core half or cavity half). In the example illustrated the carrier body is in the form of a plate portion 511 and the take-out receivers correspond to the transfer tubes 170 configured to interact with preforms presented on the mold pins of the mold core half.

Referring also to FIG. 6, in the example illustrated, the plate portion 1511 has a front face 1513 and the transfer tubes 1170 project from the front face 1513 of the plate portion 511. Each tube has an interior nest 1519 for accommodating a preform, the nest 1519 having an open outer end 1521 and a generally closed bottom end 1523. The nest 1519 can be configured to generally match the outer profile of the preform 112 received therein, with at least portions of the outer surface of the preform that are targeted for cooling bearing against the inner surface of the transfer tube. In the example illustrated, the closed bottom end 523 is configured to engage the outer surface 126*b* of the closed convex end (dome portion) of the preform.

Figure 12B:
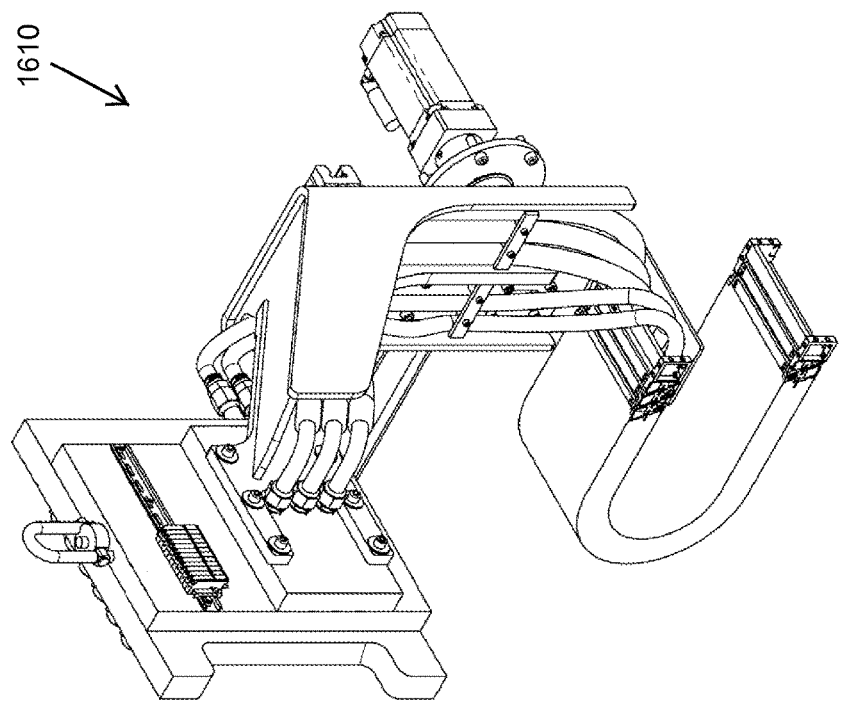
FIGS. 12A and 12B are front and rear perspective views of another portion of the part handling apparatus of the machine of FIG. 1.
Figure 12A:
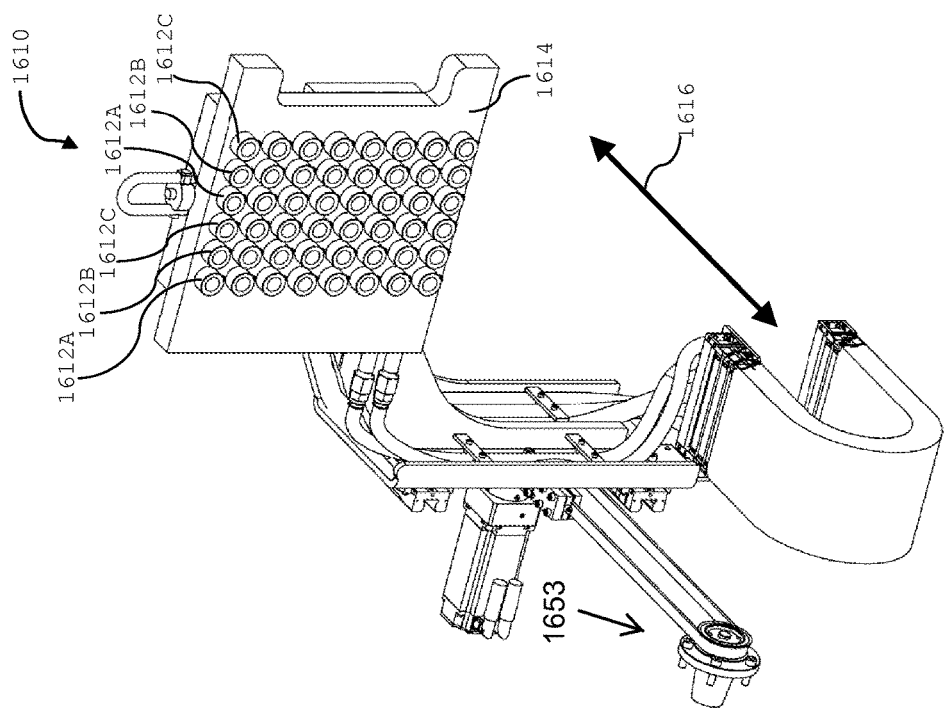

With reference now to FIGS. 12A and 12B, the supplemental cooling device 1610 comprises features that are similar in many respects to the take-out plate 1164. The supplemental cooling device includes a plurality of second cooling receivers in the form of second tubes 1612 affixed to a carrier plate 1614. The supplemental tubes include at least a first supplemental tube set of first supplemental tubes 1612*a*, of equal quantity and spatial arrangement as the first pins 1154*a* of the first pin set. In the example illustrated, the supplemental cooling device 1610 further includes a second supplemental tube set of second supplemental tubes 1612*b*, and a third supplemental tubes set of third supplemental tubes 1612*c*. The tubes 1612*b*, 1612*c*, are also arranged to match the quantity and spatial arrangement of the pin pattern of the second set pins 1154*b* and third set pins 1154*c*, respectively.

Figure 13:
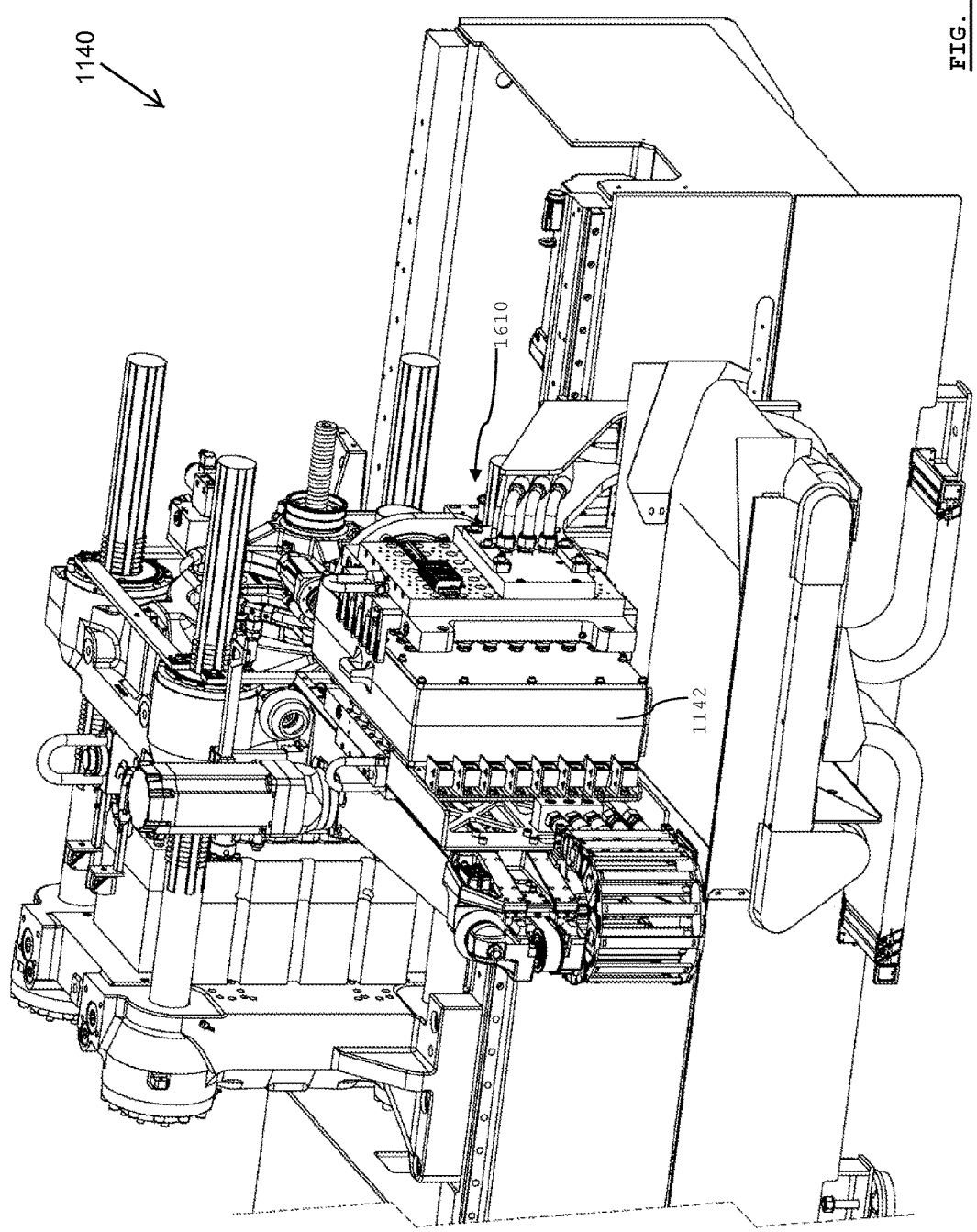
FIG. 13 is a perspective view of the structure of FIG. 3, showing both sides of the shell engaged by cooling tubes.

The supplemental cooling device 1610 is, in the example illustrated, moveable relative to the cooling shell 1142 between a supplemental engaged position (FIG. 13) and a supplemental disengaged position (FIG. 3). In the supplemental engaged position, the carrier plate 1614 and the shell side 1144 positioned at the supplemental cooling station 1150*c* are drawn together, with the pins 1154*a* of the first pin set entering the supplemental tubes 1612*a* of the first supplemental tube set. Likewise when in the supplemental engaged position, in the example illustrated, the second pins 1154*b* and third pins 1154*c* enter the respective second supplemental tubes 1612*b* and third supplemental tubes 1612*c*, respectively. When in the supplemental disengaged position, the supplemental tubes 1612 are generally clear of the cooling pins 1154, allowing, in the example illustrated, unobstructed rotation of the shell 1142.

In the example illustrated, the carrier plate 1614 (and supplemental tubes 1612 affixed thereto) is moved between the supplemental engaged and disengaged positions by (x-axis) translation along a first supplemental axis 1616, parallel to the machine axis 1105. In some examples, the carrier plate 1614 may be moveable in other directions or along other axes, including multiple axes.

In use, one set of articles ("Set A") is produced in a first injection cycle. Once the articles have partially cooled enough to allow removal from the mold without damaging or distorting the shape of the article, the mold is opened, and the first set of articles are transferred from the mold to retained engagement on the take-out plate.

In the example illustrated, the molded articles are preforms that are still warm when removed from the mold. The preforms have exterior surfaces and interior surfaces that are targeted for post-mold cooling. When in retained engagement on the take-out plate, the exterior surfaces of the preforms are conductively cooled by, in the example illustrated, bearing against inner surfaces of the transfer tubes 1170. The preforms can nest closely within the transfer tubes, and a first suction applied to the interior of the tubes can hold the preforms securely in the tubes. A stripper plate or similar structure can be provided at the mold to help release the preforms from the mold core pins.

Once the articles have been loaded into the transfer tubes, the take-out plate can shuttle out of the mold area (i.e. to the z-axis retracted position) so that the mold can reclose to produce a subsequent set of articles in the mold.

Outside the mold, the take-out plate and the cooling shell can be drawn together. In the example illustrated, the take-out plate is advanced to the x-axis advanced position (load engagement position), at which point the pins 1154 of the shell side in the load position 1150*a* are positioned axially within the respective transfer tubes 1170.

During steady state operation, in the example illustrated, the take-out plate will be completely loaded with preforms when moving towards the load engagement position. The first set of articles may, in the example illustrated, be loaded in the first set tubes 1170*a* of the take-out plate 1164. A previous set of articles ("Set Z") produced in the previous injection cycle may have been loaded in the third set tubes 1170*c*, and a set of articles produced in a cycle previous to that ("Set Y" articles) may have been loaded in the second set transfer tubes 1170*b*. Each of the tubes 1170 provide conductive cooling to the exterior surfaces of the preforms that are in retained engagement within the tubes 1170.

When in the load engagement position, respective pins 1154*a*, 1154*b*, and 1154*c* enter the preforms retained in the respective tubes 1170*a*, 1170*b*, and 1170*c* and, in the example illustrated, provide convective cooling to the interior surfaces of the preforms. The convective cooling is, in the example illustrated, provided by a suction air stream drawing air into the open end of the preform, through the intermediate space 1501 between the pin and the inner surface of the preform, then through the distal openings of the channel in the pin, and then into the shell side chamber. In the example illustrated, the suction force holding the preform in the tube is greater than the suction force generated in the intermediate space 1501 by the pin's cooling airflow, so the preform remains in retained engagement in the tube while the tube suction force is applied.

At the load engaged position, before withdrawing the take-out plate 1164 from the transfer cooling shell 1142, at least one set of preforms can be released from retained engagement on the take-out plate and transferred to retained engagement on the transfer shell 1142. To facilitate the release of preforms from retained engagement from the tubes and transfer to retained engagement on the shell, the tube suction force can be terminated, and can be reversed to urge the preform out of the tube. The suction force exerted by the pin can pull the preform into retained engagement on the pin. In the example illustrated, the preform is pulled against a seat located near the base of the pin, with vent or gate apertures remaining open to allow continued air flow into and through the intermediate space 1501. In some examples, the base of the pin may have a seal surface, and the edge of the open end of the preform may bear against the seal surface when the preform is in retained engagement on the shell. Engaging the seal surface can increase the suction force in the intermediate space 1501, which can increase the force holding the preform on the pin when transferred thereto.

The transfer pin 1154 may have a resilient tip biased away from the base that contacts the dome portion when the take-out plate is in the load engaged position, both before and after transfer of the preforms from the take-out plate to the shell. In the example illustrated, a spring is provided to urge the tip away from the base.

In the example illustrated, the coldest set of the three sets of preforms in the take-out plate (i.e. the preforms that have been retained on the take-out plate for the longest period of time, the "Set Y" articles in this example), are transferred from the take-out plate to the cooling shell (e.g. from the second set tubes 1170*b* to the second set pins 1154*b*).

After transferring the set of preforms to the shell 1142, the take-out plate 1164 can retract from the shell 1142 and the shell 1142 can rotate 180 degrees to move the first shell side to the supplemental cooling station. In the example illustrated, the shell is rotated 180 degrees in a clockwise direction (as viewed from the non-operator side of the machine), moving through the station 150*b* at 90 degrees of rotation, in which the first shell side is generally vertical and positioned above the shell axis, and then 90 degrees further to the supplemental cooling device at station 150*c*.

At the supplemental cooling station 150*c*, the supplemental cooling device and the cooling shell can be drawn together to a supplemental engaged position in which the cooling pins are axially inside at least a portion of the length of the supplemental cooling tubes. When at the supplemental engaged position, the preforms retained on the cooling pins are inserted into the interiors of the supplemental tubes. The preforms may then be released from the cooling shell and transferred to retained engagement on the supplemental cooling device. In the example illustrated, prior to part transfer, a slight gap is provide between outer surface of the preforms retained on the shell and the inner surface of the supplemental tubes. Transfer is facilitated by applying a vacuum to the interiors of the supplemental tubes, the tube vacuum being greater than the cooling pin vacuum, so that the preforms are pulled axially off the pins and seated snugly within the supplemental tubes.

In the example illustrated, the preforms are transferred from the shell to the supplemental device generally immediately after the device is in the supplemental engaged position. The supplemental device can then hold that position for a cooling pause until the injection cycle requires that the shell rotate to receive the next set of parts from the take-out plate. The supplemental tubes provide conductive cooling to the exterior surfaces of the preforms held in retained engagement therein (similar to the conductive cooling provided by the take-out tubes). During the cooling pause, the interior surfaces of the preforms can be simultaneously cooled via convective cooling provided by the airflow through the pins. Furthermore, in the example illustrated, simultaneous interior and exterior cooling is provided to the preforms on both sides of the shell at the same time (see FIGS. 13 and 14).

During steady state operation, in the example illustrated, the supplemental cooling device will have only a single empty set of supplemental tubes. The empty set of tubes corresponds, each cycle, to the lone set of cooling pins of the shell side that have preforms loaded thereon. In the example illustrated, the other two sets of supplemental tubes carry preforms loaded therein from previous injection cycles. For example, the set of preforms (set Y) loaded on the second set pins 1154*b* can be loaded into the empty second set supplemental tubes 1612*b*. The third set of supplemental tubes 1612*c* can be loaded with a set of preforms (set W) from a previous injection cycle, and the first set of supplemental tubes 1612*a* can be loaded with a set of preforms formed in a further previous injection cycle. The coldest preform (from the earliest injection cycle) can, before the supplemental device disengages the shell, be transferred back to the shell. The vacuum to the respective tube set can be terminated and a positive pressure can be applied to facilitate transfer of the preforms out of the supplemental tubes and into the shell. As the shell side rotates through the unload position, the vacuum in the shell side chamber switches to positive pressure to facilitate dropping the preforms.

Looking at the progression of the first set of articles in the example illustrated, upon withdrawal from the mold, the first set preforms are retained in the transfer tubes 1170*a* and engage the first set cooling pins 1154*a* of the shell during a first subsequent cycle, carried away from the shell back into the mold and then again to the shell for a second cycle, carried back to the mold and again to the shell for a third cycle, after which the first preforms are transferred to the shell. The shell rotates and the first set of preforms are then transferred to the first set supplemental tubes 1612a with subsequent pin engagement during a fourth cycle, then moved away from the pins (while retained in the supplemental tubes) and moved back into engagement with the pins during a fifth cycle, and then moved away from, and back into engagement with, the pins during a sixth cycle, following which the first set of preforms are transferred back to the shell.

Referring now to FIGS. 15a-15f, another example of a portion of an injection molding machine 2100 is shown, with similar features as the machine 1100 identified by similar reference characters, incremented by 1000.

The machine 2100 includes a part-handling apparatus 2140 for holding and treating articles from a mold of the injection molding machine 2100. The part handling apparatus 2140 is separate from the mold and includes a take-out plate 2164 having at least one set of first cooling receivers 2170 for receiving and retaining a first set of molded articles from the mold. In the example illustrated, the take-out plate has three sets of first cooling receivers 2170. The first cooling receivers 2170 are, in the example illustrated, in the form of cooling tubes and are also referred to as first cooling tubes 2170. The first cooling receivers 2170 conductively transfer a first amount of thermal energy away from the first molded articles retained therein.

The part handling apparatus 2140 further includes a supplemental cooling plate 2610 having at least one set of second cooling receivers 2612 for receiving and retaining the first set of articles. The second cooling receivers 2612 are configured to conductively transfer a second amount of thermal energy away from the first molded articles retained therein. The supplemental cooling plate has, in the example illustrated, three sets of second cooling receivers 2612. In the example illustrated, the supplemental cooling plate is mounted to a supplemental slide 2651 fixed to the base, the supplemental slide generally parallel to the machine axis (see FIG. 15D). A supplemental actuator (similar to actuator 1653 of FIG. 12A) is, in the example illustrated, coupled to the supplemental cooling plate 2610, for advancing and retracting the supplemental cooling plate 2610 towards and away from the transfer shell.

The part handling apparatus 2140 further includes a transfer shell 2142 having at least one shell side comprising at least one set of transfer pins 2154 for receiving and retaining the first set of articles. In the example illustrated, the transfer shell 2142 has only one shell side 2144, with three sets of transfer pins 2154 (each set including two columns of pins 2154).

The transfer shell 2142 is rotatable about a shell axis 2146 for moving the at least one shell side 2144 among a load position for engagement with the take-out plate 2164, a supplemental cooling position 2150c for engagement with the supplemental cooling plate, and an unload position 2150d for releasing the molded articles from the part handling apparatus 2140.

Figure 15A:
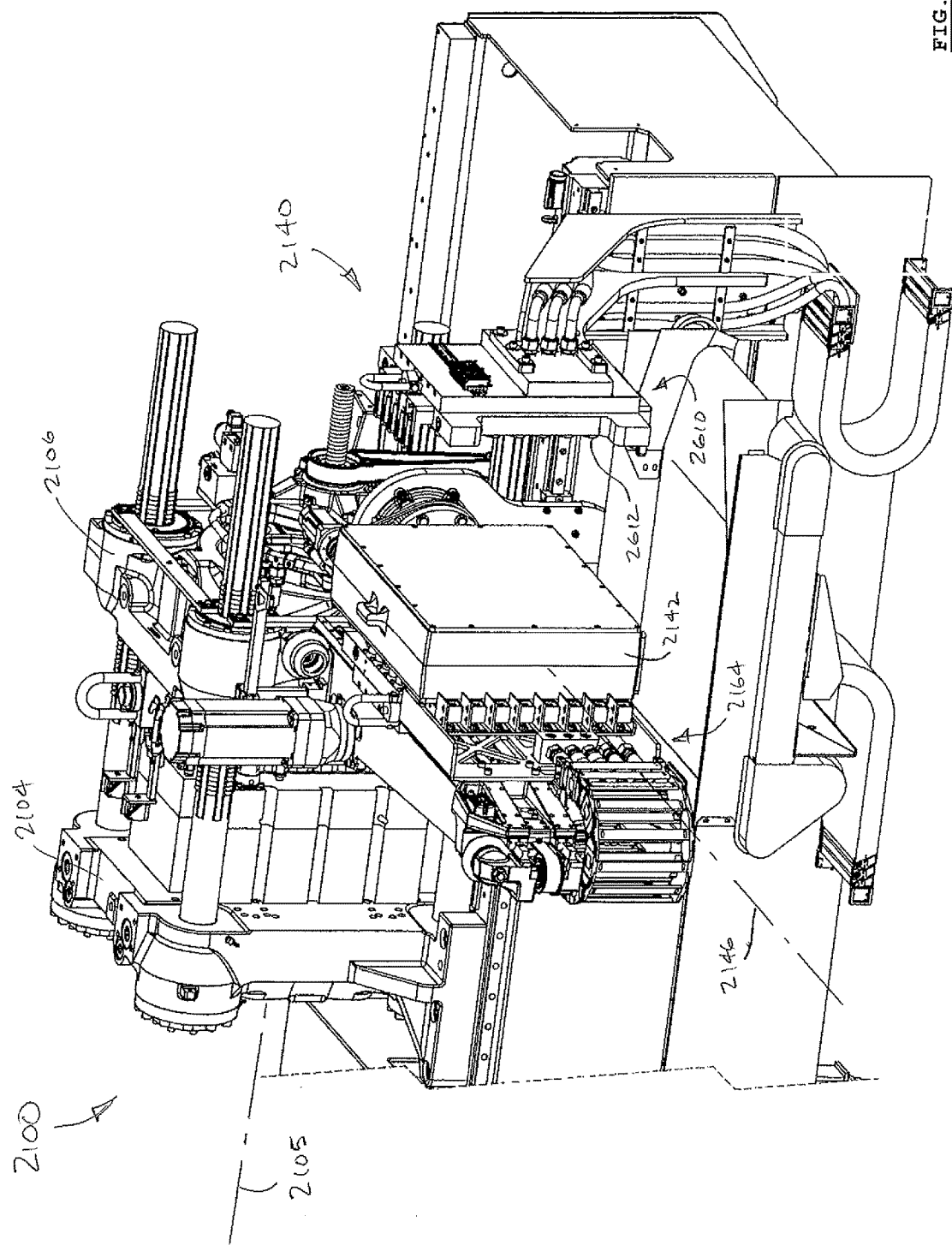

In use, the take-out plate 2164 moves to a z-axis advanced position to receive a first set of molded articles into a first set of first cooling tubes 2170 from the mold core pins of the mold of the injection molding machine. The take-out plate 2164 then moves back to a z-axis retracted position (clearing the mold so that the mold can close for the next injection cycle), and engages the shell side 2144. In the example illustrated, this engagement comprises moving the take-out plate 2164 to an x-axis advanced position, so that the transfer pins 2154 of the transfer shell 2142 penetrate the interiors of the preforms. This position is illustrated in FIG. 15A.

In the example illustrated, the take-out plate 2164 has three sets of first cooling tubes 2170, and the first set of preforms remain in the first set of first cooling tubes 2170 until the other two sets are loaded with respective sets of preforms. The take-out plate 2164 disengages the transfer shell 2142 by moving to the x-axis retracted position, carrying the first set of preforms 112 with it, before entering the mold area at the appropriate point in the next two cycles.

After loading the third set of first cooling tubes 2170 of the take-out plate 2164, the take-out plate again engages the transfer shell 2142. But prior to disengagement, the first set of molded articles are released from the first set of first cooling tubes 2170 and transferred into retained engagement on the first set of transfer pins 2154. The take-out plate 2164 then disengages the transfer shell, with the first set of first cooling tubes empty and ready to receive the next set of molded articles from the mold of the machine. As seen in FIG. 15B, the first set of molded articles 112 are retained on the first set of transfer pins 2154 of the shell side 2144 of the transfer shell 2142.

As also illustrated in FIG. 15B, when the take-out plate 2164 is in the first axis (x-axis) retracted position, the first cooling receivers 2170 of the at least one set of first cooling receivers of the take-out plate 2164 are opposed to and in vertical and horizontal alignment with the second cooling receivers 2612 of the at least one set of second cooling receivers of the supplemental cooling plate 2610. This is exemplified by dashed line 2613a in FIG. 15B, showing the horizontal and vertical alignment of a selected first cooling receiver 2170a with a corresponding second cooling receiver 2612a.

Figure 15C:
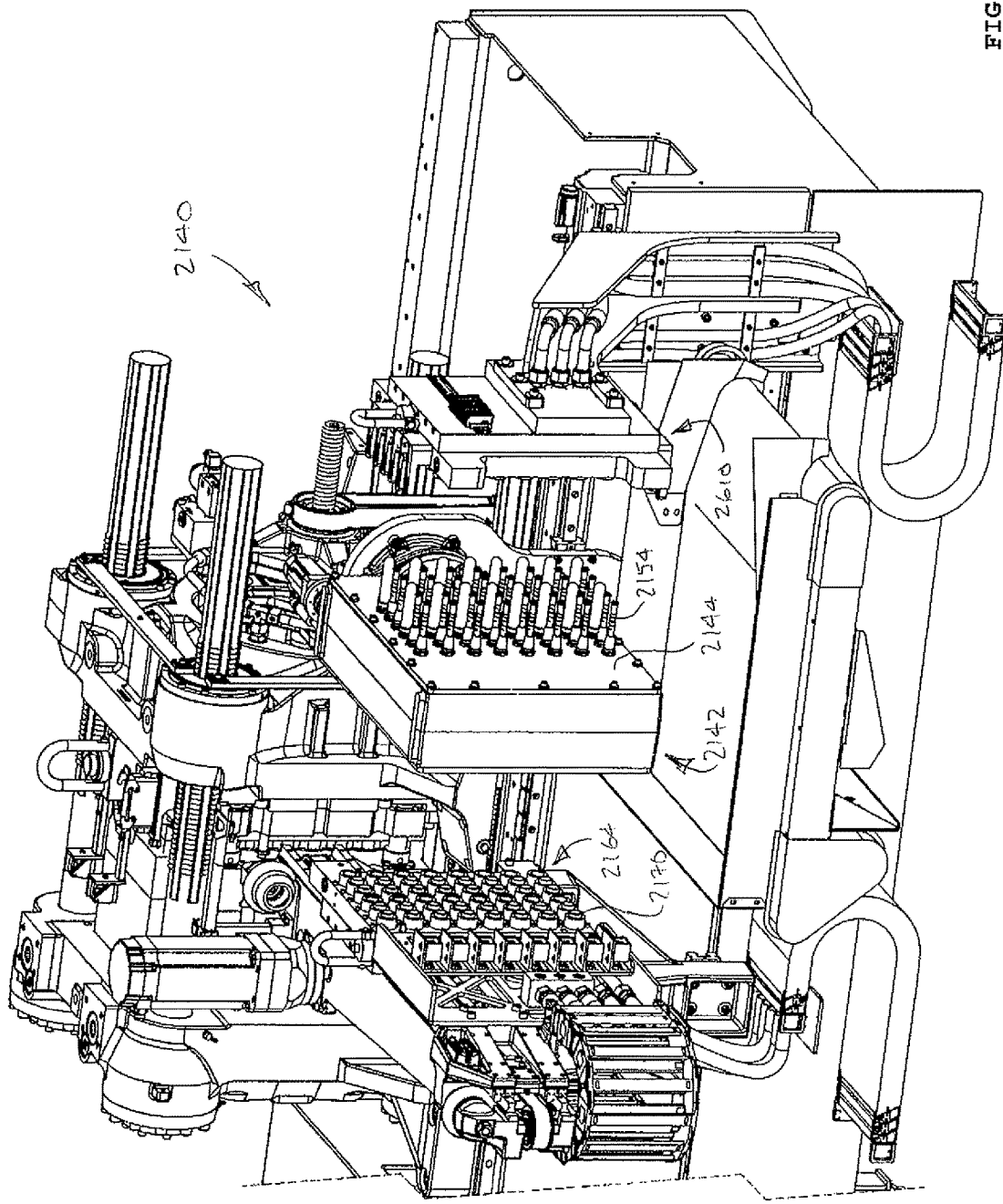
Figure 15D:
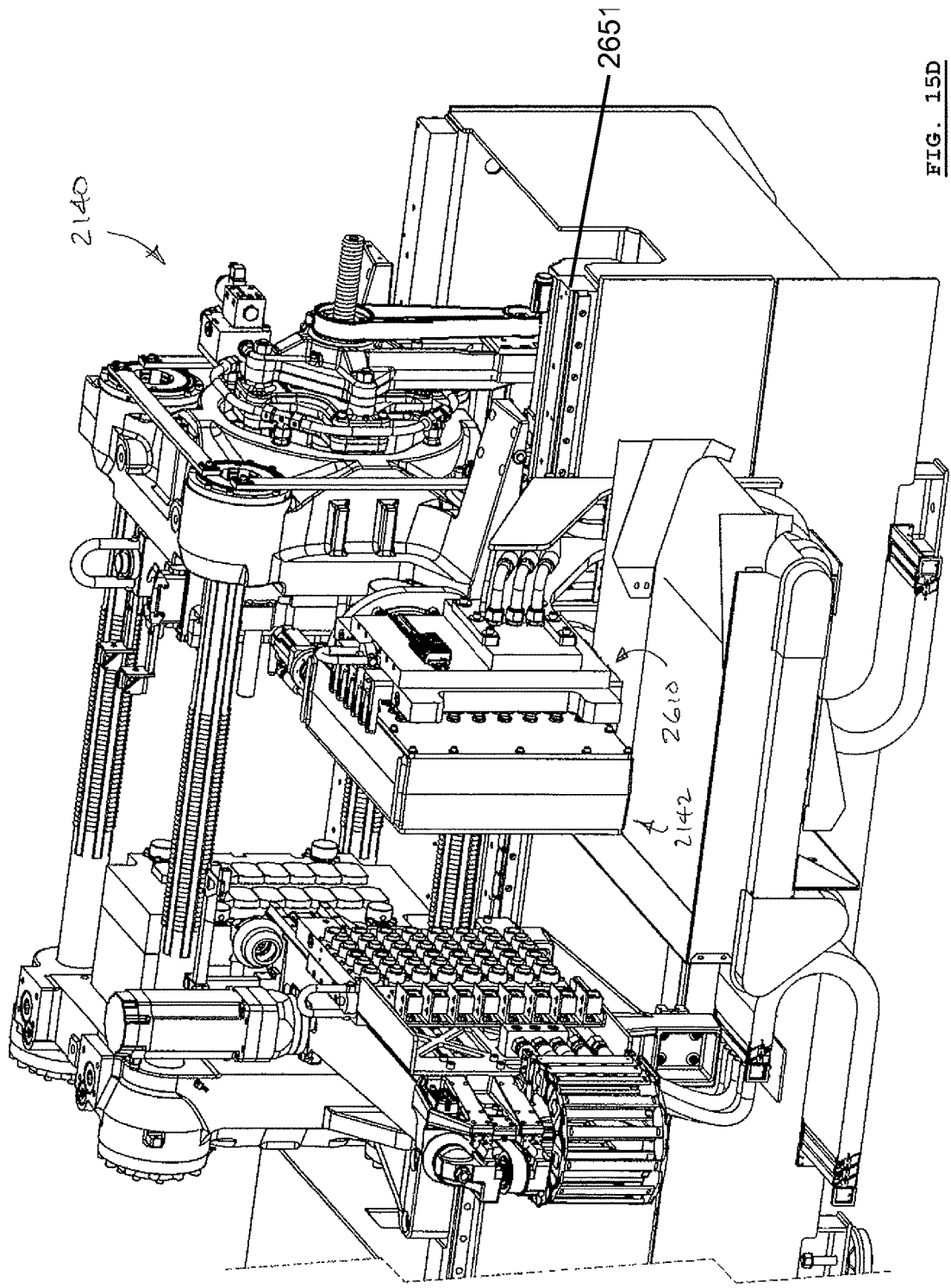

With reference to FIG. 15C, upon disengagement of the take-out plate 2164 and the transfer shell 2142 and with the first set of molded articles retained on the transfer pins 2154, the transfer shell 2142 rotates 180 degrees to position the shell side 2144 in the supplemental cooling position. The transfer shell 2142 then engages the supplemental cooling plate 2610, with the first set of preforms 112 entering into a corresponding empty set of second cooling receivers (second cooling tubes) 2612. This state is shown in FIG. 15D. In the example illustrated, the supplemental cooling plate is slidably coupled to the machine base 2102, and a supplemental actuator urges the supplemental cooling plate from a supplemental retracted position to a supplemental advanced position.

Upon engagement with the supplemental cooling plate, in the example illustrated, the first set of preforms 112 are quickly released from retained engagement on the transfer pins 2154 and into retained engagement within the second cooling tubes 2162 of the supplemental cooling plate 2160, with exterior surfaces of the preforms 112 bearing against inner surfaces of the second cooling tubes for conductive heat transfer away from the preforms 112.

Figure 15E:
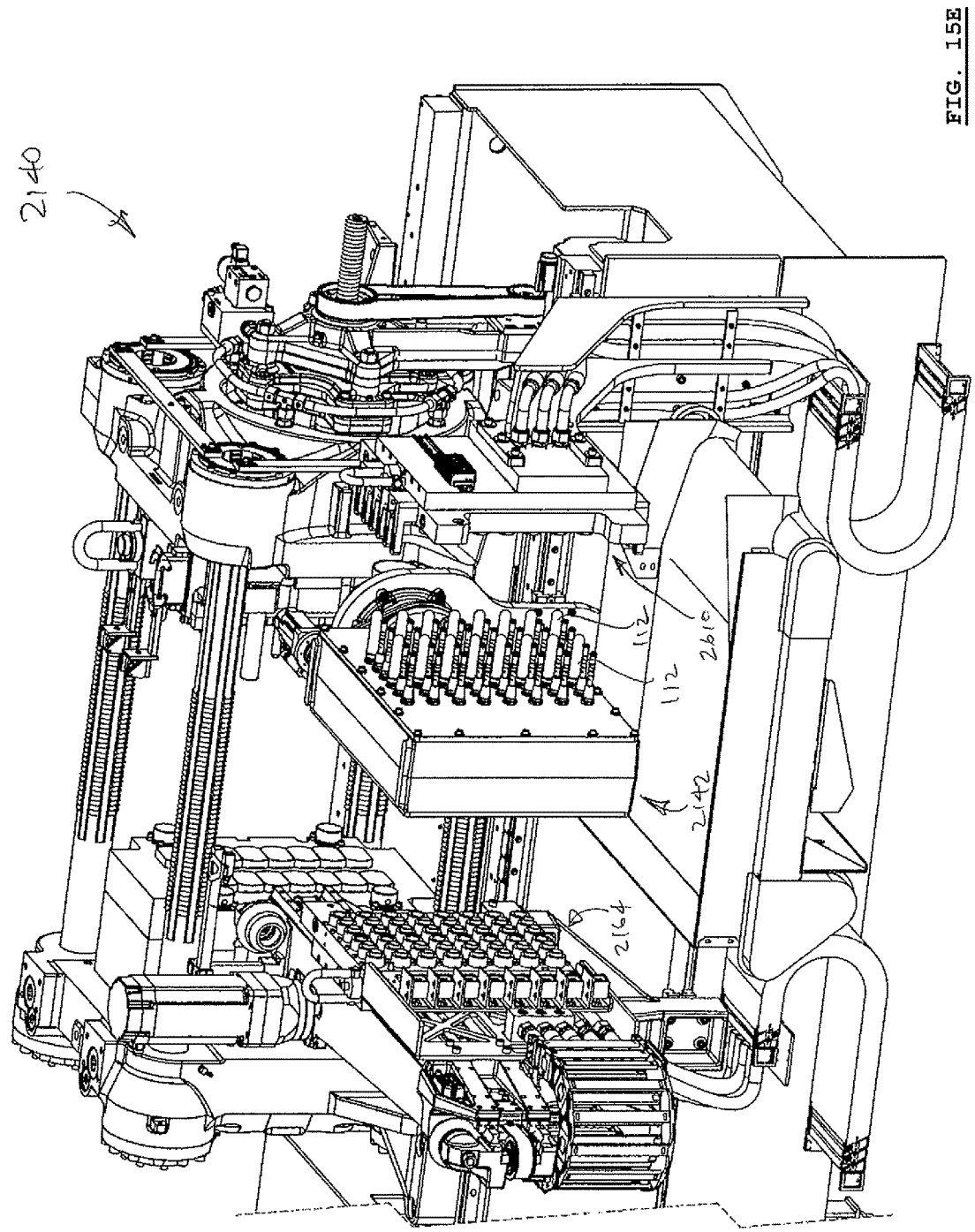

With reference to FIG. 15E, the first set of preforms remains in the second cooling tubes 2612 for two more cycles (i.e. in the case of machine start-up, until the second and third sets of second cooling tubes 2612 have been loaded with respective sets of preforms). Then before disengagement of the transfer shell 2142 and the supplemental cooling plate 2610, the first set of preforms 112 are released form retained engagement in the set of second cooling tubes 2612, and are transferred back to retained engagement on the set of transfer pins 2154.

Figure 15F:
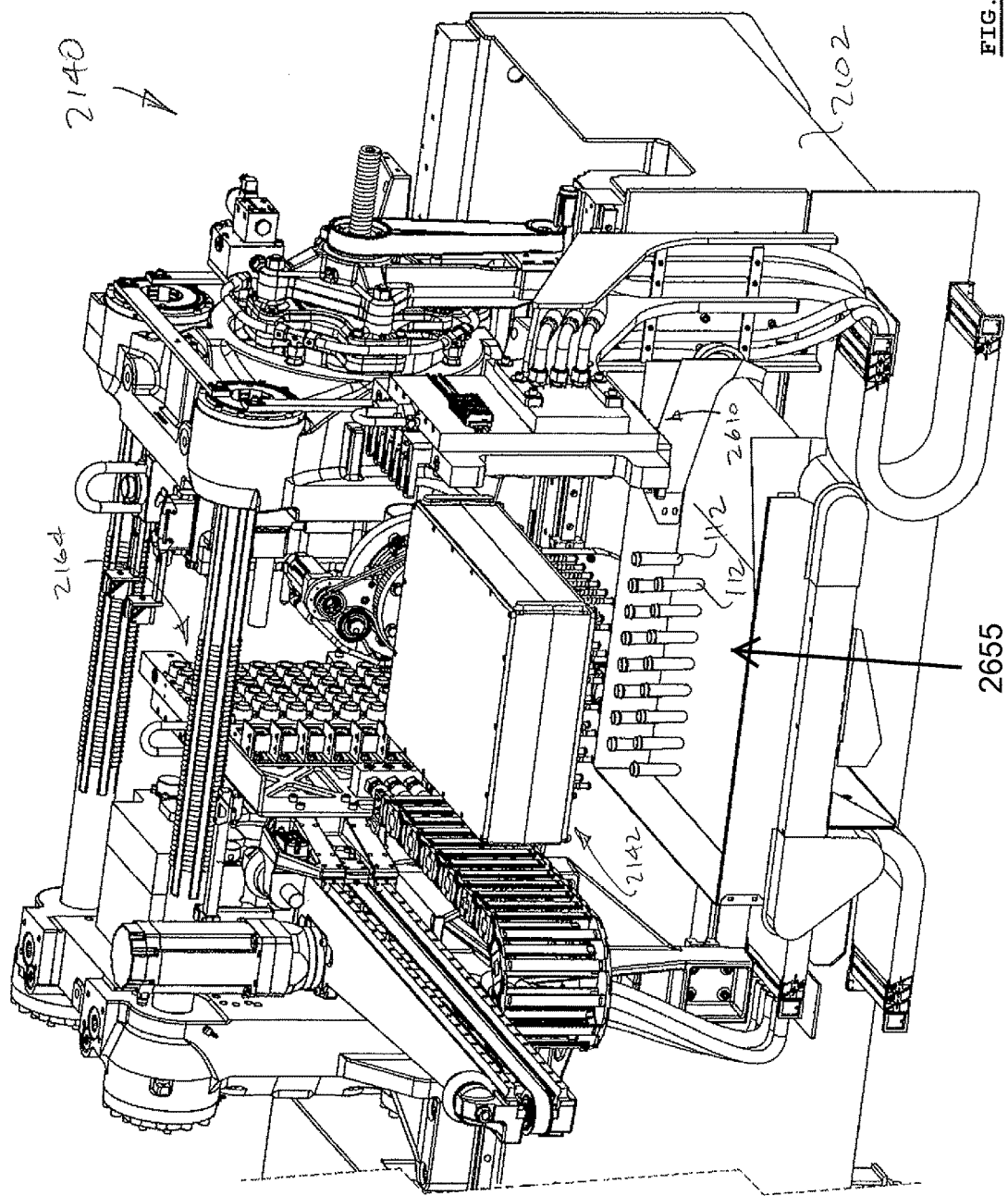

In FIG. 15F, the transfer shell 2142 has rotated 90 degrees to move the shell side 2144 to the unload position. When in or moving through the unload position, the first set of preforms may be released from the transfer pins 2154 and

The invention claimed is:

1. An injection molding machine, comprising:
   a) a base;
   b) a pair of platens supported by the base, the platens supporting respective mold halves to form a mold and the platens moveable relative to each other in a direction parallel to a machine axis between mold-open and mold-closed positions; and
   c) a part-handling apparatus for holding and treating articles from the mold, the part handling apparatus separate from the mold and comprising:
      i) a take-out plate comprising at least one set of first cooling receivers for receiving and retaining a first set of molded articles from the mold, the first cooling receivers conductively transferring a first amount of thermal energy away from the first molded articles;
      ii) a supplemental cooling plate comprising at least one set of second cooling receivers for receiving and retaining the first set of molded articles, the second cooling receivers conductively transferring a second amount of thermal energy away from the first molded articles; and
      iii) a transfer shell having at least one shell side comprising at least one set of transfer pins for receiving and retaining the first set of molded articles, the transfer shell rotatable to move the at least one shell side among a load position for engagement with the take-out plate, a supplemental cooling position for engagement with the supplemental cooling plate, and an unload position for releasing molded articles from the part handling apparatus,
   wherein the at least one shell side of the transfer shell comprises a first shell side and a second shell side, the second shell side generally parallel to and spaced apart from the first shell side.

2. The injection molding machine of claim 1, wherein the take-out plate is movable along a first axis to a first axis advanced position between the mold halves and a first axis retracted position outside the mold halves, wherein when in the first axis retracted position, the first cooling receivers of the at least one set of first cooling receivers of the take-out plate are opposed to and in vertical and horizontal alignment with the second cooling receivers of the at least one set of second cooling receivers of the supplemental cooling plate.

3. The injection molding machine of claim 2, wherein the supplemental cooling plate is mounted to a supplemental slide fixed to the base, the supplemental slide generally parallel to the machine axis.

4. The injection molding machine of claim 3, further comprising a supplemental actuator for advancing and retracting the supplemental cooling plate along the supplemental slide towards the transfer shell for effecting said engagement with the at least one shell side, and away from the transfer shell for disengaging the at least one shell side.

5. The injection molding machine of any one of claims 2-4, wherein the transfer shell is rotatable about a shell axis, the shell axis disposed in a fixed position relative to the base during operation of the machine.

6. The injection molding machine of claim 5, wherein transfer shell is mounted to a shell slide fixed to the base, and the position of the shell axis relative to the base is adjustable along the shell slide in response to a change in length of molded articles being produced.

7. The injection molding machine of claim 5, wherein each one of the first shell side and second shell side when in the supplemental cooling position, is disposed between the supplemental cooling plate and the shell axis along a direction parallel to the machine axis.

8. The injection molding machine of claim 1, wherein the second shell side is engageable by the supplemental cooling plate when the first shell side is engaged by the take-out plate, providing, for at least a portion of time during operation of the machine, simultaneous conductive cooling of respective sets of molded articles in the respective sets of first and second cooling receivers.

9. The injection molding machine of claim 1, further comprising a part removal mechanism for collecting molded articles released from the shell side at the unload position and transporting the molded articles away from the machine.

10. The injection molding machine of claim 9, wherein the part removal mechanism comprises a conveyor disposed below the transfer shell and supported by the base of the machine.

11. An injection molding machine, comprising:
   a) a machine base;
   b) opposed platens supported by the base and defining a mold area between the platens;
   c) a transfer shell spaced away from the mold area and having at least one shell side, each shell side having a plurality of transfer pins, the transfer shell rotatable about a shell axis for moving the at least one shell side among a load position, a supplemental cooling position, and an unload position;
   d) a take-out plate having a plurality of first cooling tubes for receiving molded articles from the mold and conductively cooling the molded articles retained therein, the take-out plate moveable relative to the base for presenting the molded articles in the cooling tubes to the transfer shell;
   e) a supplemental cooling device having a plurality of second cooling tubes for receiving molded articles from the transfer shell and conductively cooling the molded articles retained therein, the supplemental cooling device moveable relative to the transfer shell for engaging the at least one shell side when in the supplemental cooling position; and
   f) a part removal mechanism disposed at least partially below the shell axis for receiving molded articles released from the at least one shell side when in the unload position,
   wherein the transfer shell has two shell sides, one shell side engageable by the take-out plate and the other side simultaneously engageable by the supplemental cooling device.

12. The machine of claim 11, wherein the transfer pins are provided with suction channels in communication with a vacuum source, the suction channels drawing an airflow through a space between an inner surface of the molded articles and an outer surface of the transfer pins, the airflow convectively cooling an inner surface of the molded articles simultaneously with the conductive cooling provided by the respective cooling tubes.

13. The machine of claim 1, wherein said engagement of the at least one shell side with the supplemental cooling plate when in the supplemental cooling position comprises releasing the first set of molded articles from the transfer shell to retained engagement on the supplemental cooling plate during one cycle of the machine, and releasing the first set of molded articles from the supplemental cooling plate back to retained engagement on the transfer shell in a subsequent cycle of the machine.

14. A part-handling apparatus for holding and treating articles from a mold of an injection molding machine, the part handling apparatus from the mold and comprising:
  a) a take-out plate comprising at least one set of first cooling receivers for receiving and retaining a first set of molded articles from the mold, the first cooling receivers conductively transferring a first amount of thermal energy away from the first molded articles;
  b) a supplemental cooling plate comprising at least one set of second cooling receivers for receiving and retaining the first set of articles, the second cooling receivers conductively transferring a second amount of thermal energy away from the first molded articles; and
  c) a transfer shell having at least one shell side comprising at least one set of transfer pins for receiving and retaining the first set of articles, the transfer shell rotatable about an axis for moving the at least one shell side among a load position for engagement with the take out plate, a supplemental cooling position for engagement with the supplemental cooling plate, and an unload position for releasing the molded articles from the part handing apparatus,
  wherein said engagement of the at least one shell side with the supplemental cooling plate when in the supplemental cooling position comprises releasing the first set of first molded articles from the transfer shed to retained engagement on the supplemental cooling plate during one cycle of the machine, and releasing the first set of first molded articles from the supplemental cooling plate back to retained engagement on the transfer shell in a subsequent cycle of the machine, and
  wherein during said engagement of the at least one shell side with the supplemental cooling plate, a second shell side of the transfer shell is in the load position.

15. The machine of claim 14, wherein when in the load position, the second shell side is engageable with the take-out plate for receiving a second set of first molded articles and providing, during at least a portion of one cycle of the machine, simultaneous interior convective cooling and exterior conductive cooling of the first set of first molded articles and the second set of first molded articles.

* * * * *